(12) United States Patent
Yanagisawa et al.

(10) Patent No.: US 9,690,125 B2
(45) Date of Patent: Jun. 27, 2017

(54) DISPLAY DEVICE

(71) Applicant: Japan Display Inc., Tokyo (JP)

(72) Inventors: Syou Yanagisawa, Tokyo (JP); Nobuyuki Ishige, Tokyo (JP); Tomonori Nishino, Tokyo (JP); Kentaro Agata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/172,932

(22) Filed: Feb. 5, 2014

(65) Prior Publication Data

US 2014/0217412 A1    Aug. 7, 2014

(30) Foreign Application Priority Data

Feb. 7, 2013    (JP) .................................. 2013-022122

(51) Int. Cl.
   *G02F 1/1368*    (2006.01)
   *G02F 1/13*    (2006.01)
   *G02F 1/1345*    (2006.01)

(52) U.S. Cl.
   CPC .......... *G02F 1/1309* (2013.01); *G02F 1/1345* (2013.01)

(58) Field of Classification Search
   CPC .............................. G02F 1/1345; G02F 1/1309
   USPC ............................... 345/694, 87; 349/38, 149
   See application file for complete search history.

(56) References Cited

U.S. PATENT DOCUMENTS 7,876,122 B2    1/2011    Noumi et al.

| | | | |
|---|---|---|---|
| 2005/0157243 A1* | 7/2005 | Hayata | G02F 1/1345 349/149 |
| 2008/0117345 A1 | 5/2008 | Ishii et al. | |
| 2011/0234964 A1 | 9/2011 | Moriwaki | |
| 2012/0212684 A1* | 8/2012 | Ochiai | G02F 1/13458 348/790 |
| 2015/0286084 A1 | 10/2015 | Yoshida et al. | |

FOREIGN PATENT DOCUMENTS

| | | |
|---|---|---|
| JP | 2008-129374 A | 6/2008 |
| JP | 2009-237280 | 10/2009 |
| JP | 2010-102237 | 5/2010 |
| JP | 2011-164361 | 8/2011 |
| WO | 2010/061662 A1 | 6/2010 |
| WO | 2014/073481 A1 | 5/2014 |

OTHER PUBLICATIONS

Japanese Office Action mailed on Nov. 8, 2016 for corresponding Japanese Application No. 2013-022122.

* cited by examiner

*Primary Examiner* — Jerome Jackson, Jr.
*Assistant Examiner* — Bo Fan
(74) *Attorney, Agent, or Firm* — Typha IP LLC

(57) ABSTRACT

A display device includes a display area and a terminal area formed outside the display area. The display area has a plurality of scanning lines and a plurality of video signal lines that cross the scanning lines. The terminal area has a first terminal having a semiconductor chip connected thereto, a first line, a second line, and an inspection thin-film transistor. The inspection thin-film transistor has a gate electrode connected to the first line, a source electrode connected to the second line, and a drain electrode. The first terminal is connected to any of the plurality of scanning lines and the plurality of video signal lines.

5 Claims, 26 Drawing Sheets

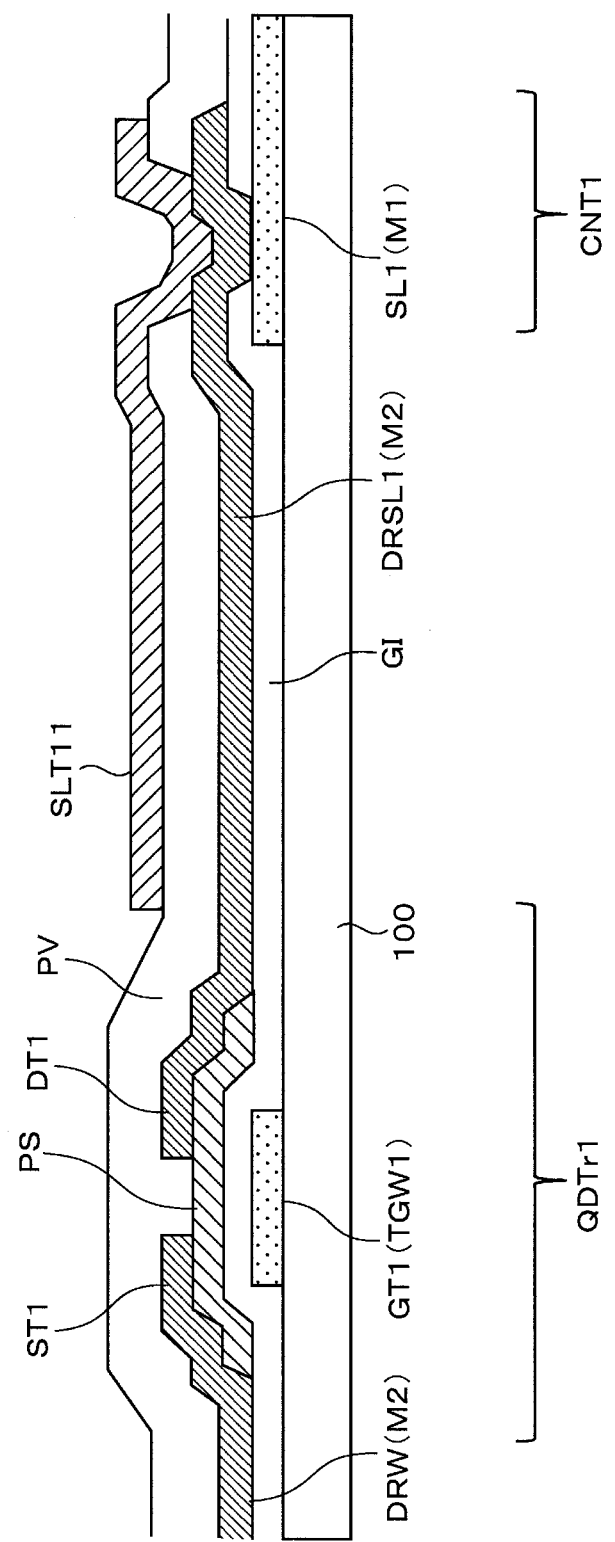

DISPLAY DEVICE

CLAIM OF PRIORITY

The present application claims priority from Japanese patent application JP2013-22122 filed on Feb. 7, 2013, the content of which is hereby incorporated by reference into this application.

BACKGROUND

The present invention relates to a display device, for example, to a technology applicable to a lighting inspection circuit to illuminate and inspect a display panel.

In an active matrix type display device, in an area near a cross of each scanning line (hereinafter called a gate line) and each video signal line (called a source line or also a drain line, and hereinafter called a source line), a thin-film transistor (TFT) turned on by a scanning signal from the gate line and a pixel electrode supplied with a picture signal from the source line via the above thin-film transistor are formed to form a pixel. The area to form a plurality of pixels is a display area, around which a peripheral area (frame area) is present. In this peripheral area, semiconductor chips forming a scanning line driving circuit, wiring (terminal wiring) to connect the gate lines and source lines on the display area to the semiconductor chip, etc. are provided.

In recent years, with higher definition of display images to improve recognition of information, the number of pixels is increasing and the number of source lines and gate lines is increasing. With these increases, in addition to the number of inputs and outputs of a semiconductor ship device, the number of terminal lines is also increasing. Therefore, a technology to form a semiconductor chip and many terminal lines on a peripheral area having a limited size is desired.

For example, Japanese Unexamined Patent Application Publication No. 2011-164361 (Patent Document 1) discusses a way to address that request. Patent Document 1 discusses a (small line pitch) technology to make small spaces between terminal lines by bending each terminal line adjacent to a terminal (terminal contact hole) formed on each terminal line. In addition, a technology to form an inspection circuit (hereinafter called a lighting inspection circuit) that carries out a pseudo dynamic lighting inspection in that line pitch, which is a failure detection way for liquid crystal display devices (liquid crystal display panels) is also discussed. After the search of the related technologies on the basis of the result invented by the present inventors, Japanese Unexamined Patent Application Publication No. 2010-102237 and Japanese Unexamined Patent Application Publication No. 2009-237280 have been found.

SUMMARY

In display devices mounted in personal digital assistants etc., high definition may be required in their size-limited bodies. Accordingly, the portion outside the display area (so-called a frame area), not relating to image displays, may be required to be further small. The area to form a lighting inspection circuit may be required to be further small. On the other hand, thin-film transistors are used as switching elements forming a lighting inspection circuit as discussed in Patent Document 1. To form the thin-film transistors, a predefined area may be required. The other subjects and new features will become clear from the description and accompanying drawings of this specification.

A display device of an embodiment is equipped with transistors for an inspection circuit in the area where a group of terminals connected to terminals of a semiconductor chip that drives signal lines of the display device.

According to the above embodiment, even when a line pitch between terminal lines is small, the area for the transistors for the inspection circuit can be ensured.

BRIEF DESCRIPTION OF THE DRAWINGS

FIG. 16 is a sectional view taken along Line C-C in FIG. 15A;

DESCRIPTION OF THE PREFERRED EMBODIMENTS

Figure 1:
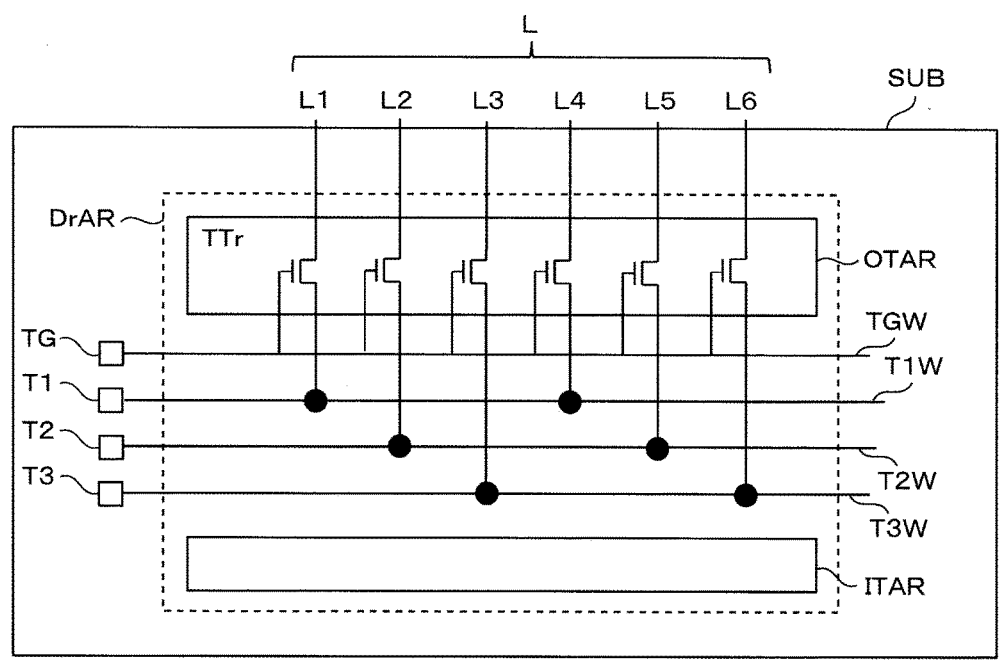
FIG. 1 shows a view to explain a configuration of a display device of an embodiment.

Hereafter, embodiment, examples, and modifications are explained using the accompanying figures. In the following explanation, the same components are indicated by the same reference numerals, and their explanation is not repeated.

FIG. 1 explains a structure of a display device of an embodiment. A circuit configuration view of FIG. 1 also shows its layout arrangement. A plurality of inspection transistors TTr respectively having common gate electrodes are disposed on a substrate SUB. The plurality of inspection transistors TTr and lines TGW, T1W, T2W, and T3W are disposed inside a semiconductor chip mounting area DrAR. The lines TGW, T1W, T2W, and T3W are connected to inspection terminals TG, T1, T2, and T3 and the plurality of inspection transistors TTr. The plurality of inspection transistors TTr are connected to lines L1, L2, L3, L4, L5, and L6 (called lines L), respectively. The lines L extend to a display area. The plurality of inspection transistors TTr are disposed inside an area (output terminal area) OTAR to which a group of output terminals of a semiconductor chip is connected. The plurality of inspection transistors TTr may be disposed inside an area (input terminal area) ITAR to which a group of input terminals of the semiconductor chip is connected. The inspection terminals TG, T1, T2, and T3 are disposed outside the semiconductor mounting area DrAR in FIG. 1, but all or part thereof may be disposed inside the semiconductor mounting area DrAR.

The inspection transistors TTr are turned on and off by signals applied to the inspection terminal TG. When the inspection transistors TTr are in the on state, signals applied to the inspection terminals T1, T2, and T3 are transmitted to the lines L. Accordingly, before the semiconductor chip is mounted, lighting inspection is achievable. When the inspection transistors TTr are in the off state, signals on the lines T1W, T2W, and T3W are not transmitted to the lines L.

The inspection transistors TTr are disposed in the area to be connected to the group of terminals of the semiconductor chip. Thus, even when the area of the semiconductor chip is small, the pitch between the terminals of the semiconductor chip is small, or the space between the input terminals and output terminals of the semiconductor chip is small, the inspection circuit containing the inspection transistors TTr and lines TGW, T1W, T2W, and T3W can be disposed inside the semiconductor chip mounting area DrAR.

Example 1

Overall Configuration

Before explanation of a specific configuration (Example) of the embodiment, a configuration of a liquid crystal display device to which this example is applied is explained. In this example, the liquid crystal display device is exampled for explanation, but this example is also applicable to other types of display devices such as an organic electroluminescence display device.

Figure 2:
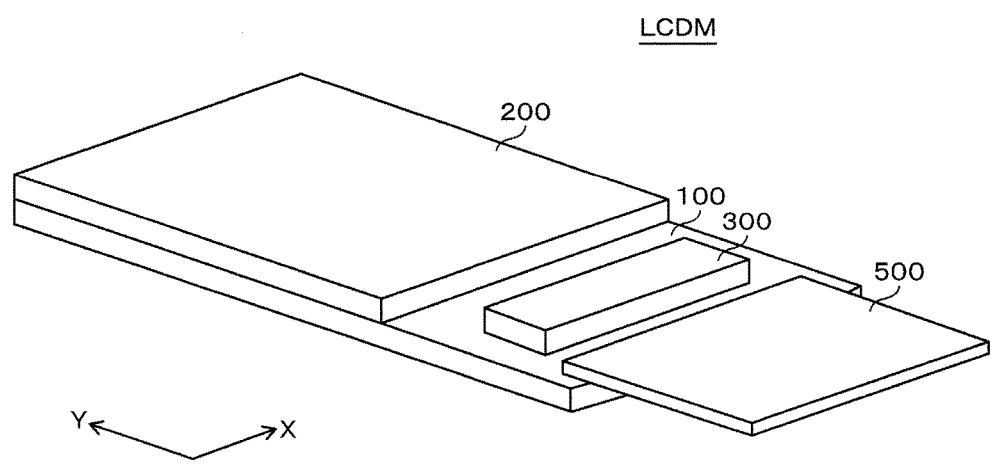
FIG. 2 shows a view to explain the overall configuration of a liquid crystal display device of Example 1.

FIG. 2 explains the overall configuration of a liquid crystal display device of Example 1. FIG. 2 shows a liquid crystal display device LCDM used for personal digital assistants such as cellular phones, smart phones, and tablet terminals. In FIG. 2, a facing substrate 200 is laminated on a TFT substrate 100 in which pixel electrodes, thin-film transistors (TFT), etc. are formed in a matrix. Color filters are formed to the facing substrate 200 correspondingly to the pixel electrodes of the TFT substrate 100 to form color images. A liquid crystal layer is sandwiched between the TFT substrate 100 and facing substrate 200. Images are formed by controlling light transmittance by use of liquid crystal molecules in each pixel. The display area is formed of the TFT substrate 100 and facing substrate 200.

A plurality of video signal lines (source lines) extending in the longitudinal direction (direction Y) and a plurality of scanning lines (gate lines) extending in the lateral direction (direction X) are present on the TFT substrate 100. Pixels are formed on the areas surrounded by the video signal lines and scanning lines. The pixel mainly has a pixel electrode and a thin-film transistor (TFT), which is a switching element. Thus, the display area is formed of many pixels formed in a matrix. On the display area of the TFT substrate 100, TFTs are formed at first, an inorganic passivation film is formed on the TFTs, and pixel electrodes are formed on the film. An insulating film of, e.g., SiN is used as the inorganic passivation film. Transparent conductive films such as ITO (Indium Tin Oxide) are used as the pixel electrodes. TFT substrate 100 is one example of the substrate SUB in the embodiment. As the TFT substrate 100, insulating substrates of silica glass, plastic (resin), etc. are used in addition to a glass substrate, for example.

An IC driver 300 to drive the video signal lines and scanning lines is disposed to the portion where the TFT substrate 100 has been exposed from the facing substrate 200. To supply a power source, signals, etc. from the outside, a flexible wiring substrate 500 is disposed.

Figure 3:
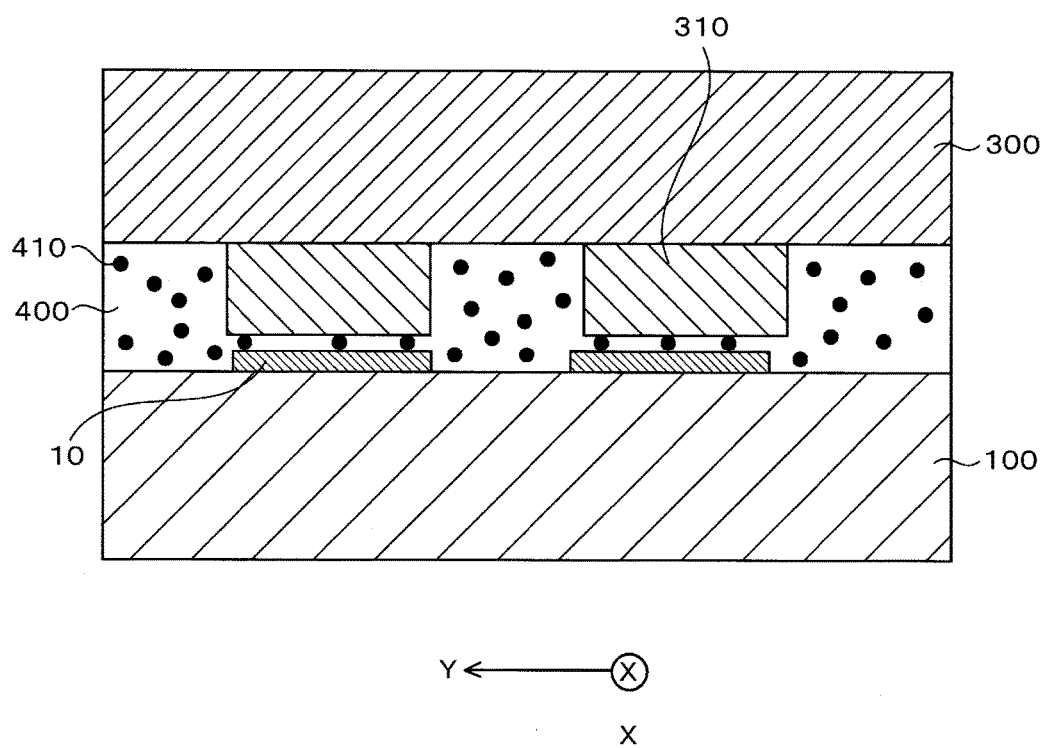
FIG. 3 is a cross sectional view showing a connection to an IC driver of the liquid crystal display device of Example 1.

FIG. 3 is a sectional view showing the connection to the IC driver of the liquid crystal display device of Example 1. As shown in FIG. 3, the IC driver 300 is connected to terminals 10 formed to the TFT substrate 100 via an anisotropic conductive film (ACF) 400. The IC driver 300 is one example of the semiconductor chip in the embodiment. In FIG. 2, the terminals 10 are formed on the TFT substrate 100. Each terminal is formed of a wiring metal, a contact hole, a transparent conductive film (ITO), etc., but not shown in FIG. 2. Bumps 310 to be connected to the terminals 10 are formed to the IC driver 300, and connected to the terminals 10 formed to the TFT substrate 100. The connection between the bumps 310 and terminals 10 is made via the anisotropic conductive film 400. Thus, the direct package of the semiconductor chip to the TFT substrate using the glass substrate etc. is called a COG (Chip On Glass) package. The terminals 10 are also called COG terminals.

The anisotropic conductive film 400 is such that conductive particles 410 are distributed to a resin film. When the IC driver 300 and TFT substrate 100 are pressed to one another, the bumps 310 and terminals 10 are electrically connected to each other via the conductive particles 410. On the other hand, since the conductive particles 410 are apart from each other in the lateral direction (direction Y) in FIG. 3, electrical conduction is not produced.

Thus, the liquid crystal display device of this example includes the plurality of scanning lines, the plurality of video signal lines that cross the plurality of scanning lines, the display area to form plurality of pixels, and the group of terminals formed outside the display area. The group of terminals has the plurality of terminals 10 that supply signals to any of the plurality of scanning lines and plurality of video signal lines via the terminal wiring.

<Lighting Inspection Circuit Configuration>

Figure 4:
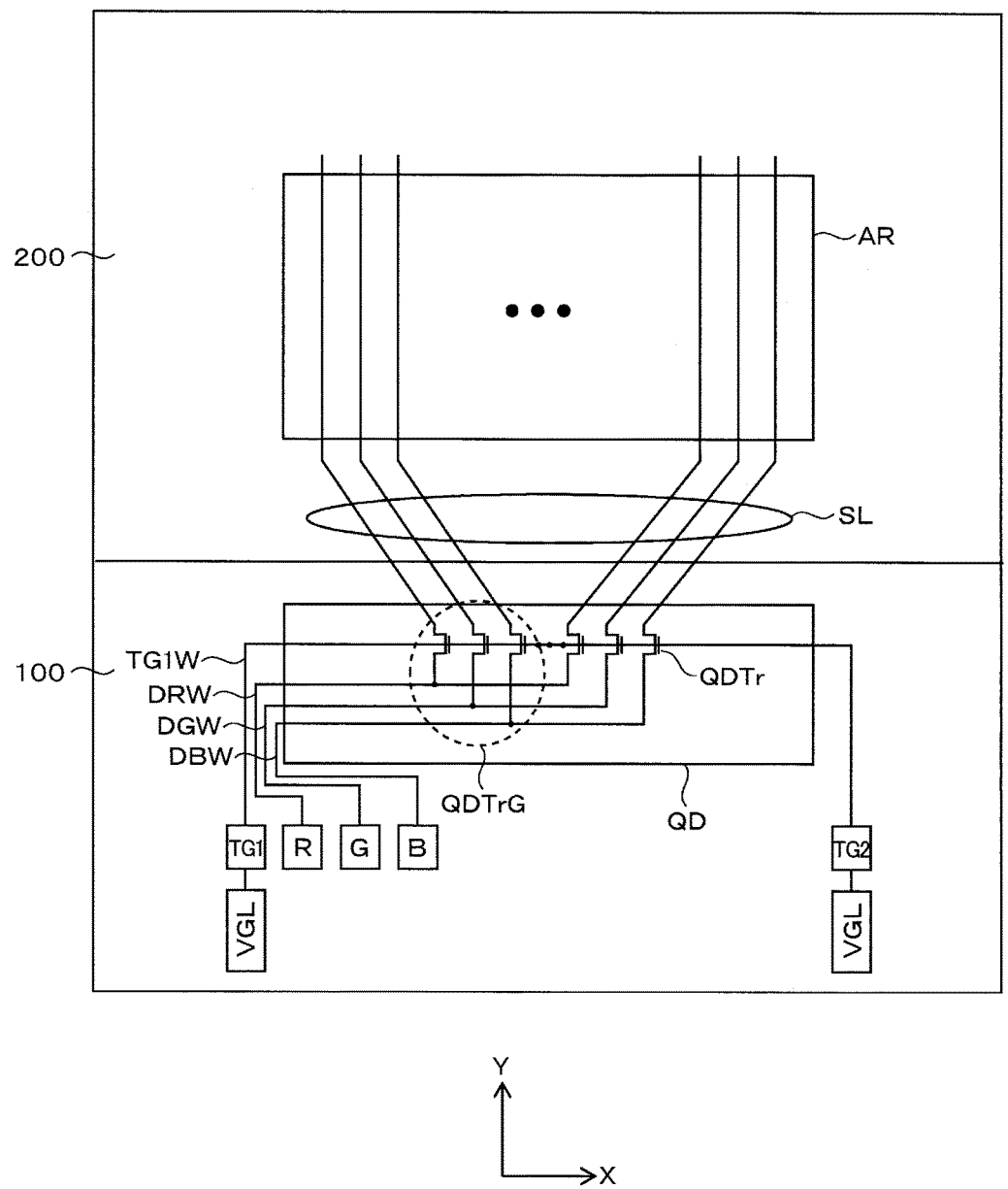
FIG. 4 is a view to explain a schematic configuration of a lighting inspection circuit in the liquid crystal display device of Example 1.

FIG. 4 explains a schematic configuration of a lighting inspection circuit in the liquid crystal display device of Example 1. Hereafter, based on FIG. 4, the configuration of the lighting inspection circuit of this example is explained. However, in the following explanation, the source electrodes of inspection thin-film transistors QDTr are connected to inspection terminals TG1, TG2, R, G, and B, and the drain electrodes of the inspection thin-film transistors QDTr are connected to source lines SL.

In the liquid crystal display device of this example, a lighting inspection circuit QD is formed to the surface on the liquid crystal side of the TFT substrate 100 and outside a display area AR. The lighting inspection circuit QD of this example includes the plurality of inspection thin-film transistors QDTr respectively having common gate electrodes. The gate electrodes of the inspection thin-film transistors QDTr are connected to the inspection terminals TG1 and TG2 via a line TG1W. The drain electrodes of the inspection thin-film transistors QDTr are connected to the source lines SL, respectively. The inspection thin-film transistors QDTr are one example of the inspection transistors TTr in the embodiment. The terminals TG1 and TG2 are one example of the terminal TG in the embodiment. Terminals R, G, and B are one example of the terminals T1, T2, and T3 in the embodiment. The lines TG1W, DRW, DGW, and DBW are one example of the lines TGW, T1W, T2W, and T3W in the embodiment. The source lines SL are one example of the lines L in the embodiment.

On the other hand, the source electrode of the inspection thin-film transistor QDTr whose drain electrode is connected to the source line SL of a thin-film transistor of a pixel of R (red) is connected to the inspection terminal R via the line DRW. The source electrode of the inspection thin-film transistor QDTr whose drain electrode is connected to the source line SL of a thin-film transistor of a pixel of G (green) is connected to the inspection terminal G via the line DGW. The source electrode of the inspection thin-film transistor QDTr whose drain electrode is connected to the source line SL of a thin-film transistor of a pixel of B (blue) is connected to the inspection terminal B via the line DBW.

As shown in FIG. 4, in the liquid crystal display device of this example, three inspection thin-film transistors QDTr connected to the inspection terminals R, G, and B form a group QDTrG of inspection thin-film transistors, which is sequentially disposed repeatedly on the formation area for the lighting inspection circuit QD. Terminals VGL are connected to the flexible wiring substrate 500, and supply a fixed potential to the terminals TG1 and TG2 after the end of lighting inspection to enable the turn-off of the inspection thin-film transistors QDTr. Only the portion where the inspection thin-film transistors QDTr are connected to the source lines SL is shown in FIG. 4, but the similar thin-film transistors, wiring, inspection terminals, etc. are also provided for gate lines.

Figure 5:
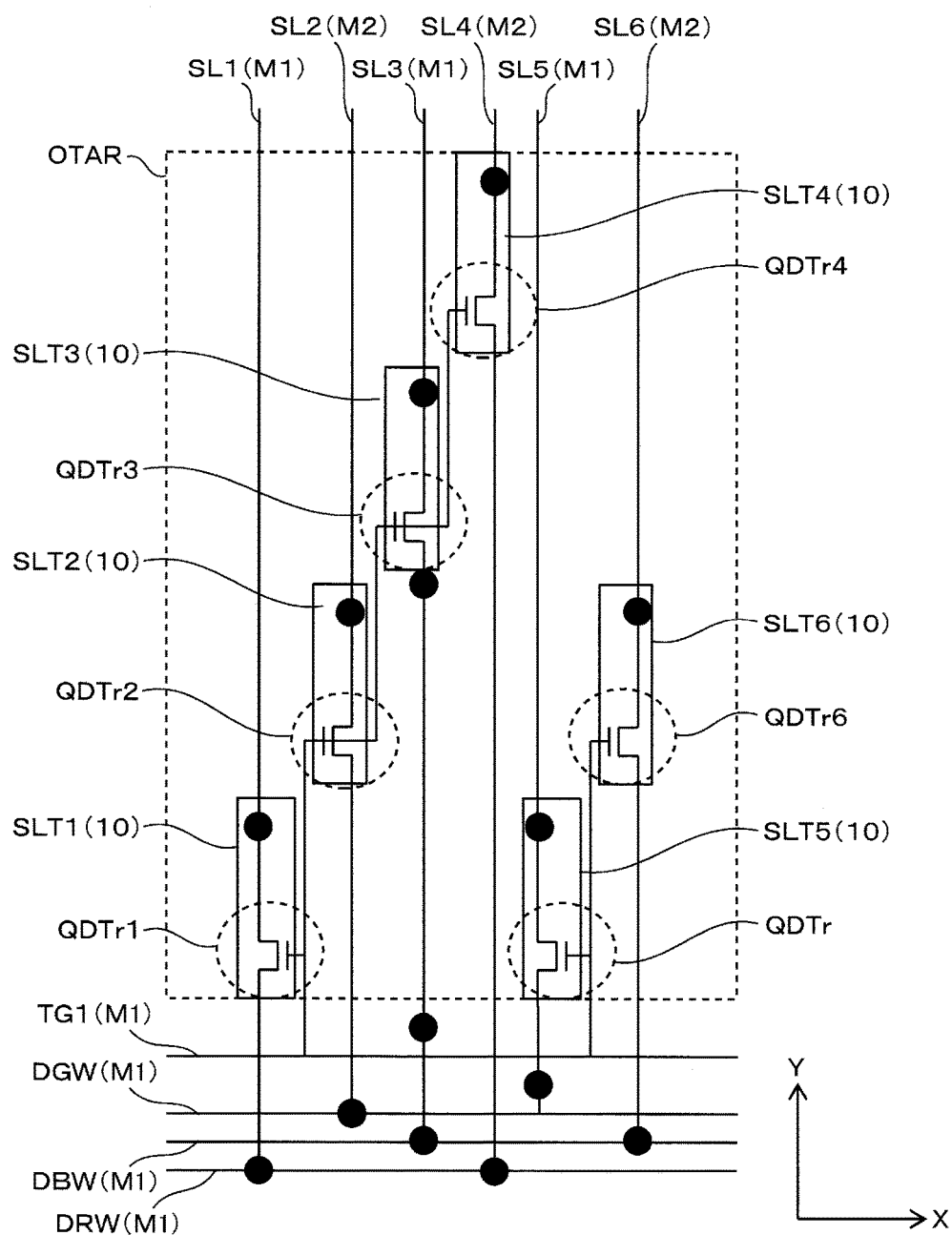
FIG. 5 shows a circuit configuration of the lighting inspection circuit in the liquid crystal display device of Example 1.

FIG. 5 is a circuit configuration view of the lighting inspection circuit in the liquid crystal display device of Example 1. The circuit configuration view of FIG. 5 also shows its layout arrangement. The lines TG1, DRW, DGW, and DBW extend in the direction X, and source lines SL1, SL2, SL3, SL4, SL5, and SL6 extend in the direction Y. Terminals SLT1, SLT2, SLT3, SLT4, SLT5, and SLT6 correspond to the terminals 10 shown in FIG. 3 in four-step staggered arrangement. That is, the terminals SLT1, SLT2, SLT3, SLT4, SLT5, and SLT6 are offset by every four in the direction Y. The inspection thin-film transistors QDTr are disposed below the terminals SLT1, SLT2, SLT3, SLT4, SLT5, and SLT6, respectively.

A metal layer M1 that forms the gate electrodes of the inspection thin-film transistors QDTr are used for the lines TG1, DRW, DGW, and DBW that extend in the direction X. The metal layer M1 is used also for the source lines SL1, SL3, and SL5. On the other hand, a metal layer M2 that forms the source electrodes and drain electrodes of the inspection thin-film transistors QDTr is used for the lines TG1, DRW, DGW, and DBW that extend in the direction Y. The metal layer M2 is used also for the source lines SL2, SL4, and SL6. The metal layer M1 and metal layer M2, which are formed in different layers, can be disposed proximate to one another. The black dots shown in FIG. 5 show contacts to connect the metal layer M1 and metal layer M2 to one another, contacts to connect the metal layer M2 and terminals 10 (terminals SLT2, SLT4, and SLT6) to each other, or contacts to connect the metal layer M1, metal layer M2, and terminals 10 (terminals SLT1, SLT3, SLT5) to each other. In FIG. 5, the output terminal area OTAR to which the output terminal group of the IC driver 300 (semiconductor chip) is connected is from the left ends of the terminals SLT1 and SLT5 to the right end of the terminal SLT4. The output terminal area OTAR extends in the direction X wider than illustrated.

Figure 6:
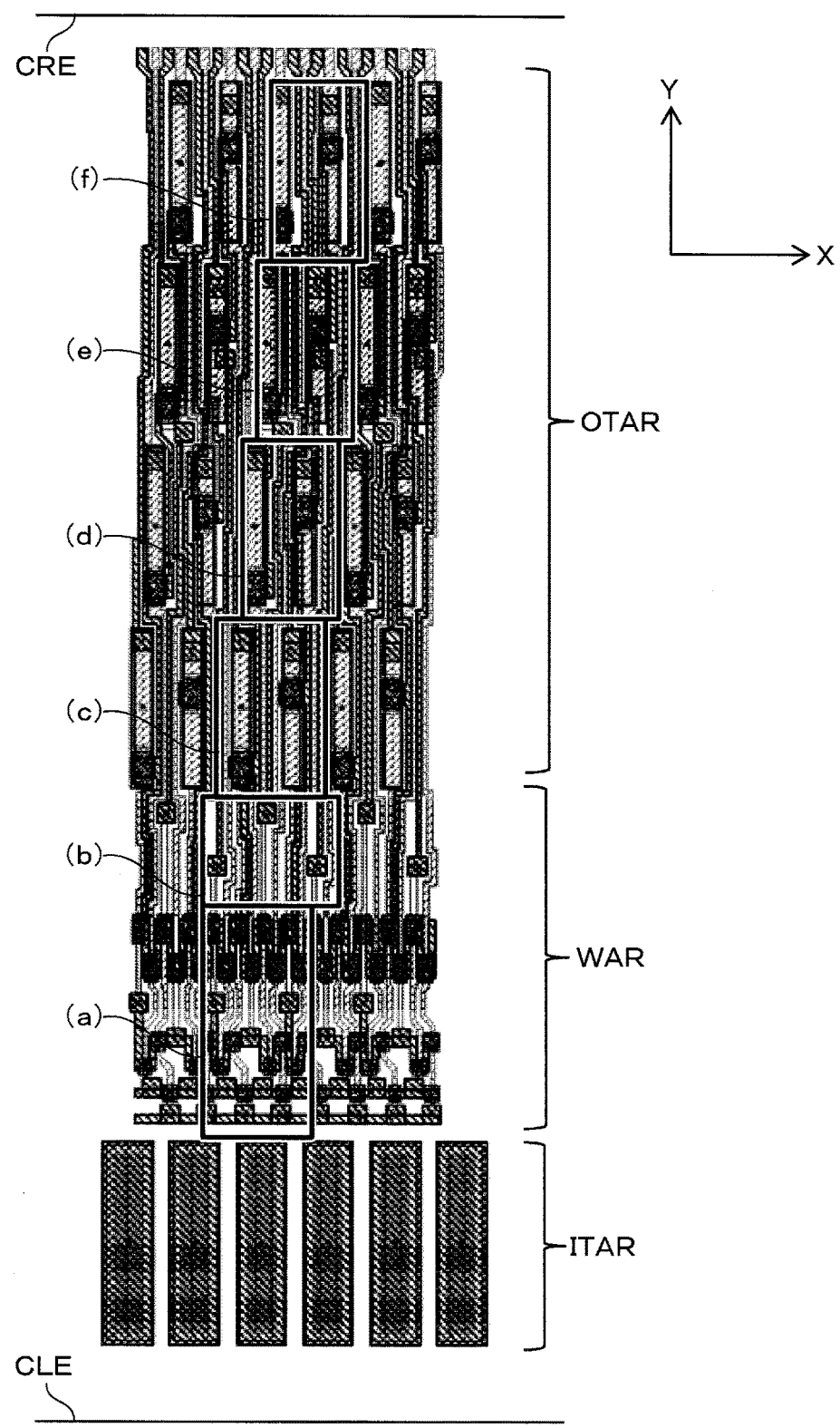
FIG. 6 is a layout pattern of the lighting inspection circuit in the liquid crystal display device of Example 1.

FIG. 6 is a layout pattern of the lighting inspection circuit in the liquid crystal display device of Example 1. FIG. 6 shows the layout pattern of the lighting inspection circuit between the portion where one end CLE of the semiconductor chip of the IC driver 300 is located and the portion where the other end CRE of the semiconductor chip is located. From the bottom of FIG. 6, an input terminal area ITAR to which the group of input terminals of the semiconductor chip is connected, a wiring area WAR, an output terminal area (inspection transistor area) OTAR to which the group of output terminals of the semiconductor chip is connected are located in this order. In FIG. 6, one layout pattern including twelve terminals, twelve inspection thin-film transistors and lines therewith, and contacts is repeated.

Figure 7:
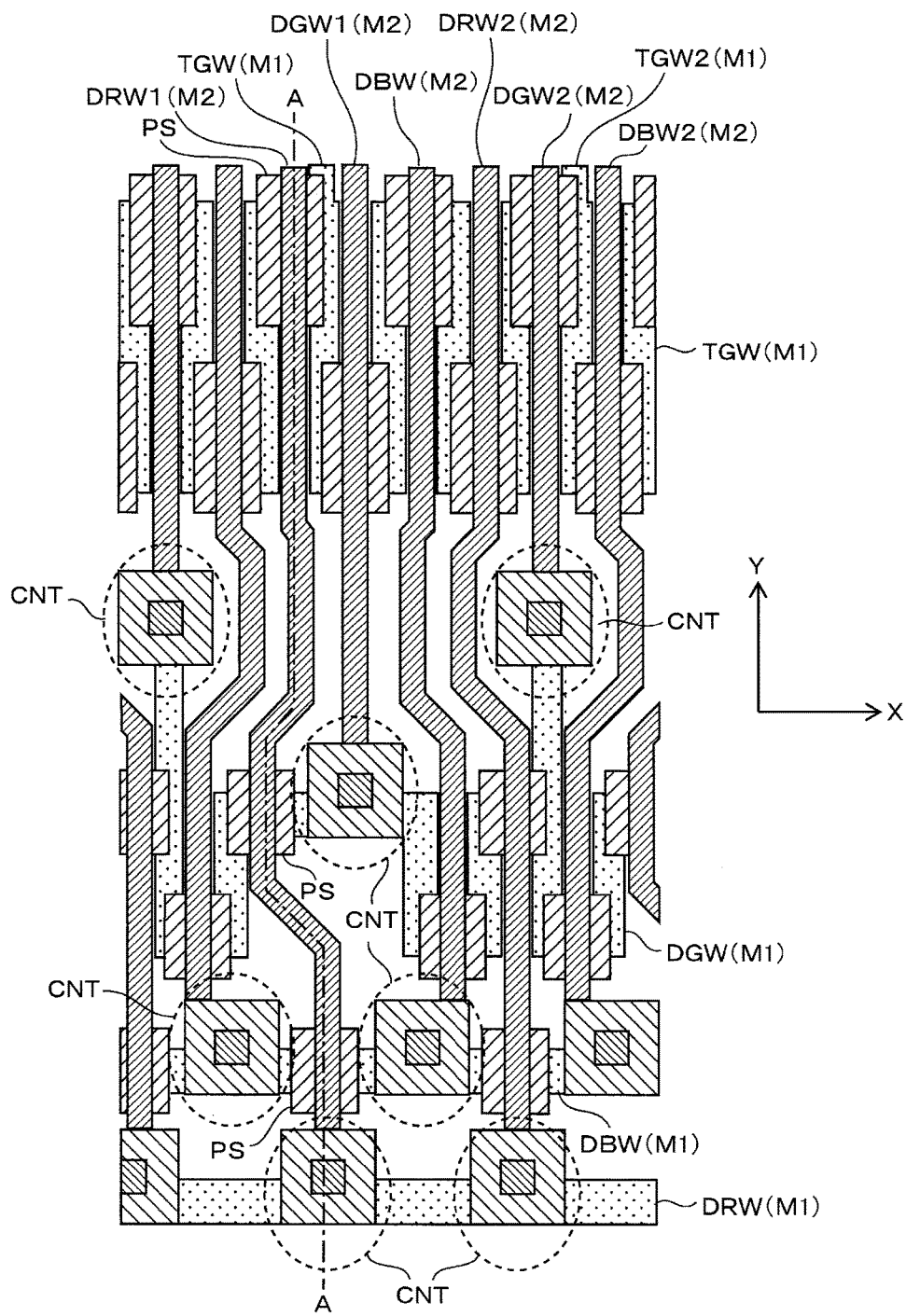
FIG. 7 is an exploded layout pattern of a portion (a) squared by the thick solid line in FIG. 6.

FIG. 7 shows an exploded layout pattern of a portion (a) squared by the thick solid line in FIG. 6. The lines TGW, DRW, DGW, and DBW formed of the metal layer M1 extend in the direction X. The lines DRW1, DGW1, DBW1, DRW2, DGW2, and DBW2 formed of the metal layer M2 extend in the direction Y. The lines DRW, DGW, and DBW formed of the metal layer M1 are respectively connected to the lines DRW1, DGW1, DBW1, DRW2, DGW2, and DBW2 formed of the metal layer M2 at contact portions CNT. Semiconductor layers PS are disposed to the portions where the metal layer M2 crosses over the metal layer M1 to ease the bumps. When the semiconductor layers PS are present, the short circuit is less likely to occur than when only an insulating film GI is provided between the metal layer M1 and metal layer M2.

Figure 8:
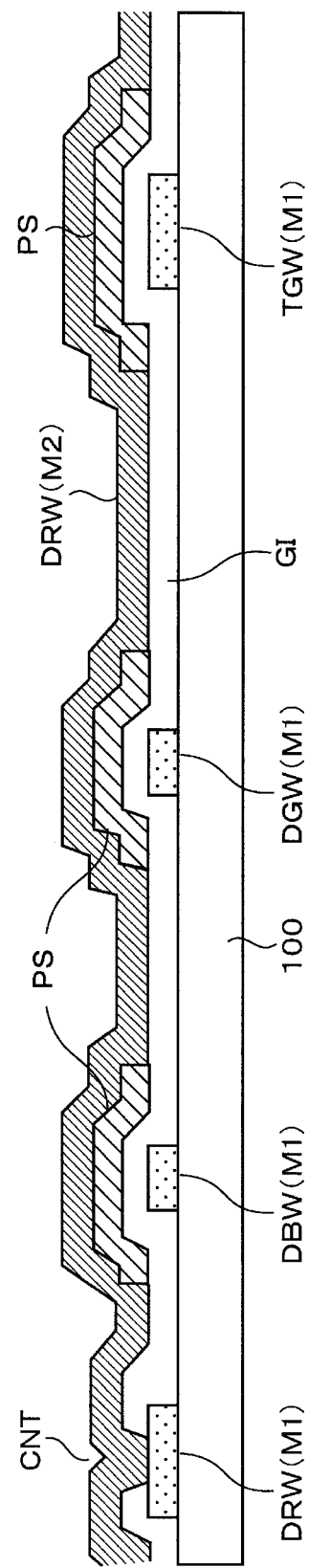
FIG. 8 is a sectional view taken along Line A-A in FIG. 7.

FIG. 8 is a sectional view taken along Line A-A in FIG. 7. The lines TGW, DRW, DGW, and DBW are formed of the metal layer M1 on the TFT substrate 100. The metal layer M2 is formed on the metal layer M1 via the insulating film GI. The line DRW formed by the metal layer M1 is connected to the line DRW formed of the metal layer M2 at the contact portion CNT. On the lines TGW, DBW, and DGW formed of the metal layer M1, the semiconductor layers PS are formed between the insulating film GI and metal layer M2.

Figure 9:
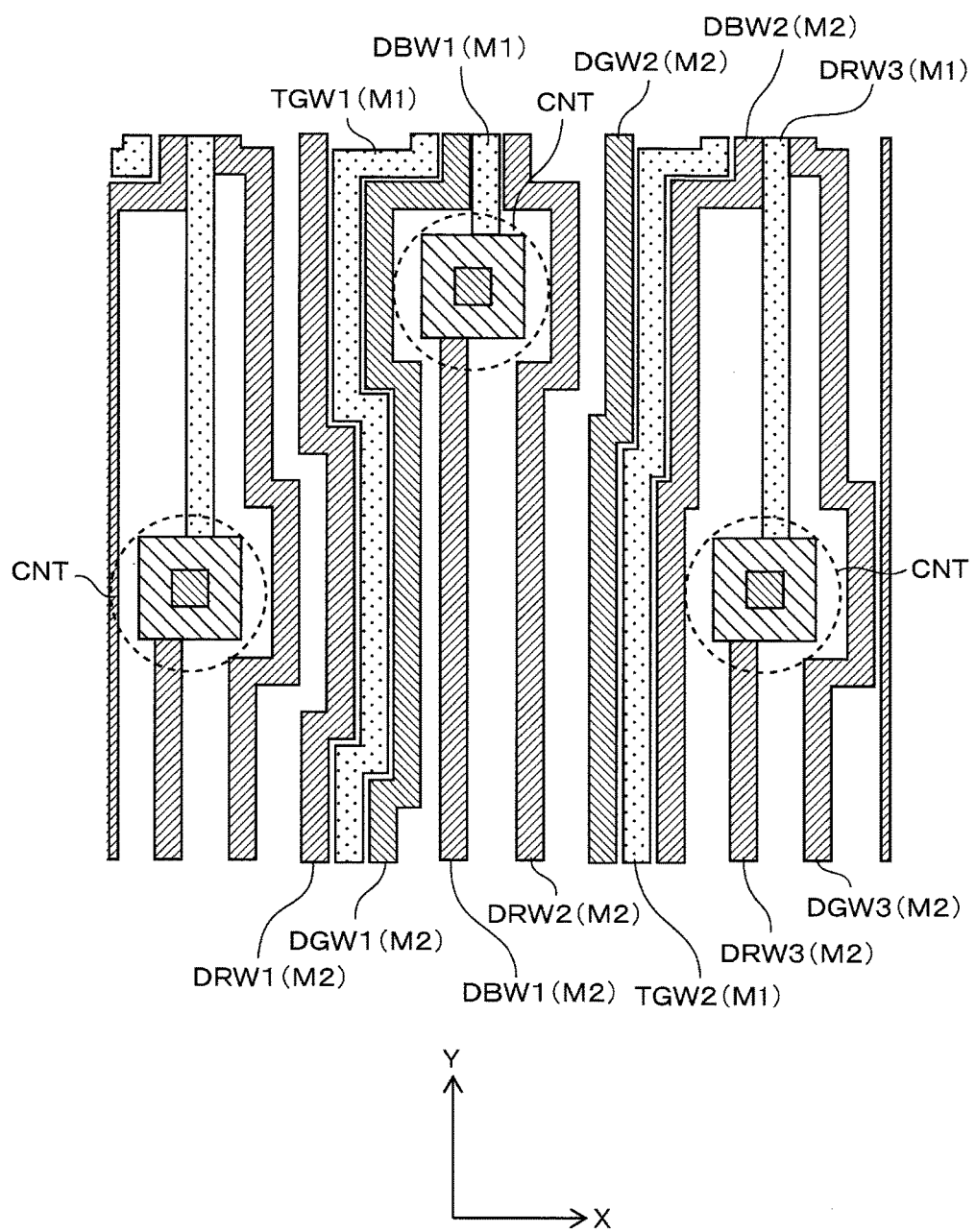
FIG. 9 is an exploded layout pattern of a portion (b) squared by the thick solid line in FIG. 6.

FIG. 9 shows an exploded layout pattern of a portion (b) squared by the thick solid line in FIG. 6. The line DBW1 formed of the metal layer M2 is connected to the line DBW1 formed of the metal layer M1 at the contact portion CNT. This is to pass the line DBW1 through the narrow space between the line DGW1 and line DRW1 that are formed of the metal layer M2.

Figure 10A:
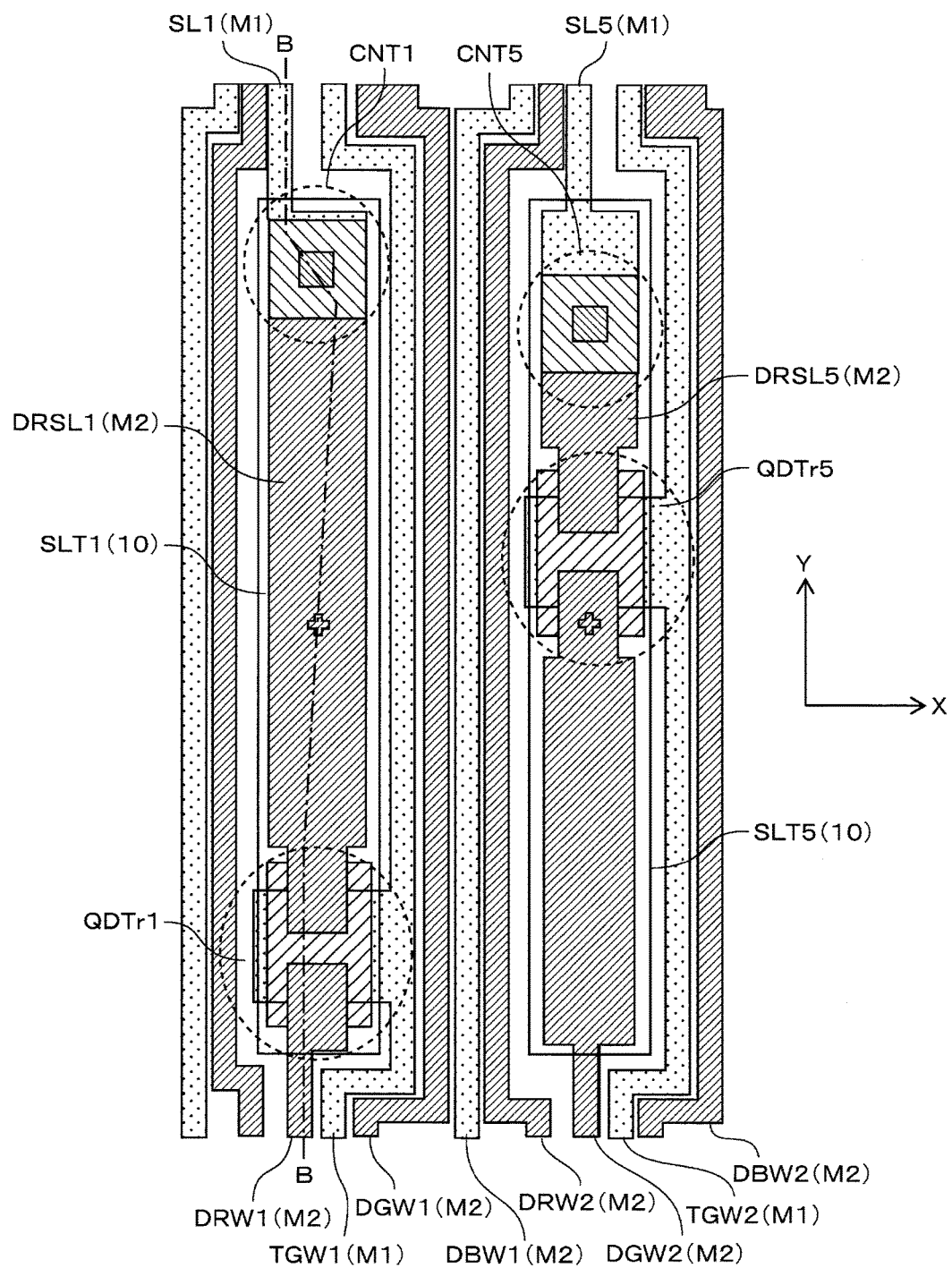
FIG. 10A is an exploded layout pattern of a portion (c) squared by the thick solid line in FIG. 6.
Figure 10B:
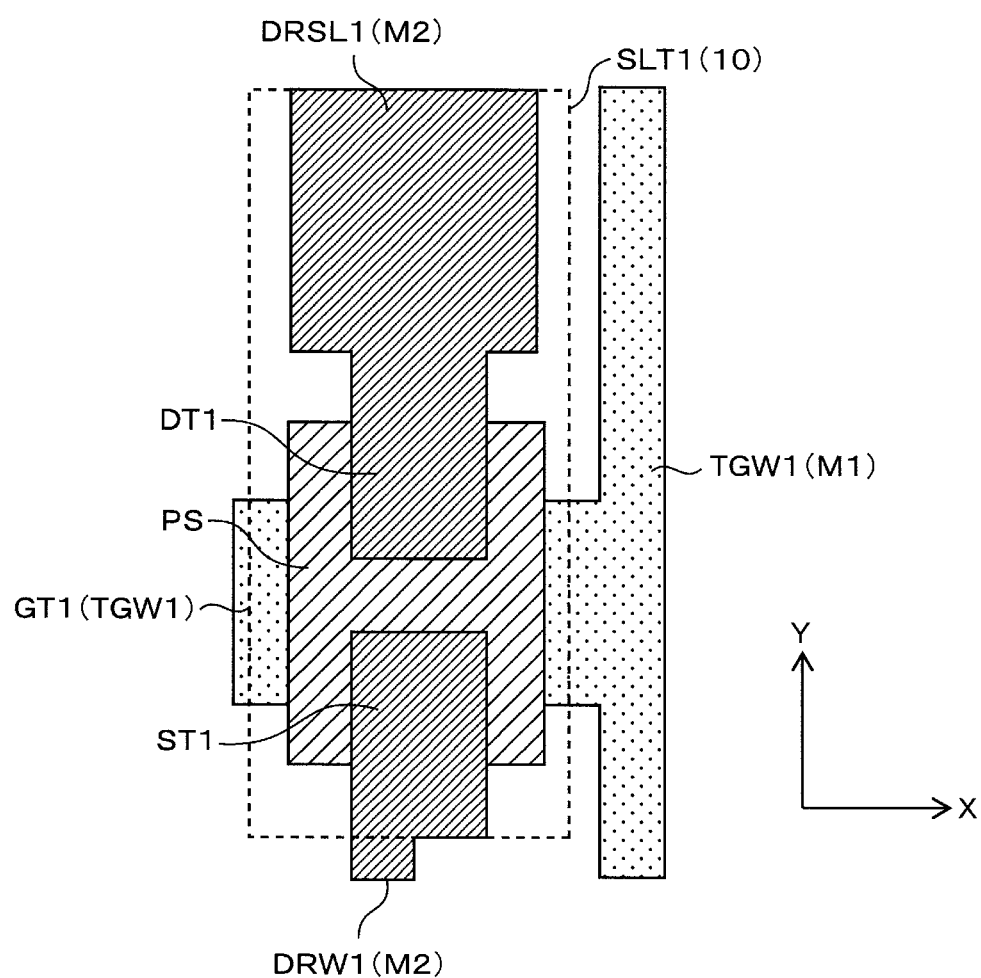
FIG. 10B is an exploded layout pattern of an inspection thin-film transistor portion for in FIG. 10A.
Figure 10C:
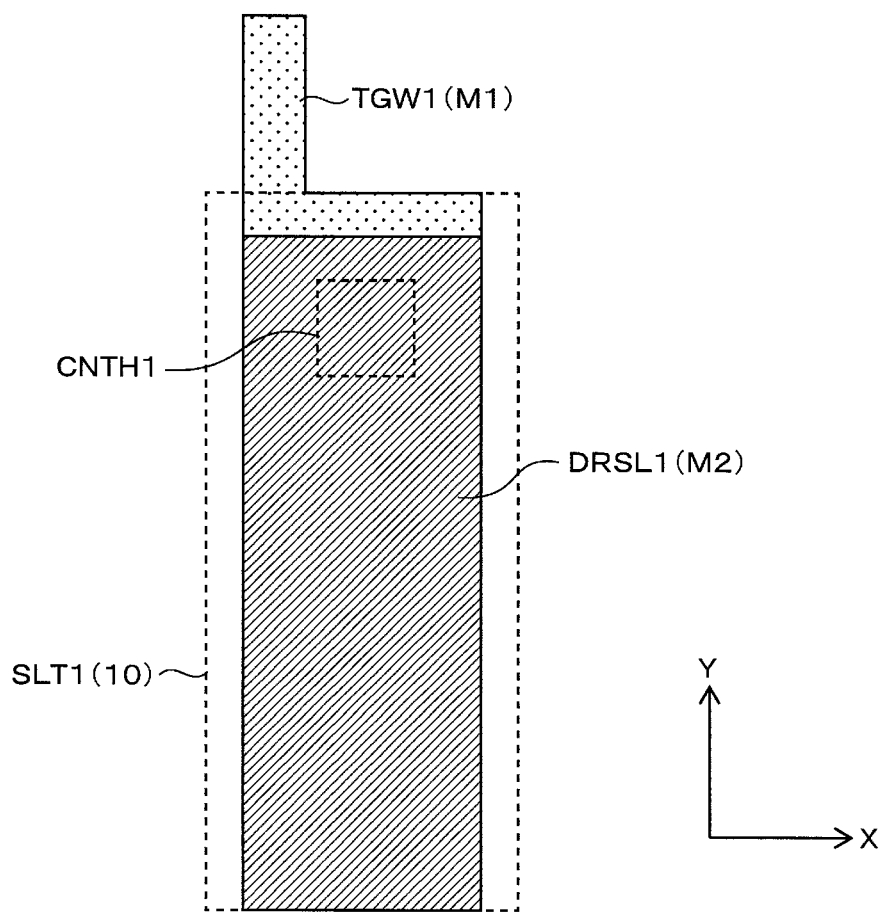
FIG. 10C is an exploded layout pattern of a contact portion in FIG. 10A.

FIG. 10A shows an exploded layout pattern of a portion (c) squared by the thick solid line in FIG. 6. FIG. 10B shows an exploded layout pattern of the inspection thin-film transistor portion in FIG. 10A. FIG. 10C shows an exploded layout pattern of the contact portion in FIG. 10A. Below the terminals SLT1 and SLT5 formed of the transparent conductive films (ITO), the inspection thin-film transistors QDTr1 and QDTr5 are disposed, respectively. The gate electrode of the inspection thin-film transistor QDTr1 located b the terminal SLT1 is formed continuously with a metal film of the same layer as a line TGW1 formed of the metal layer M1. The source electrode of the inspection thin-film transistor QDTr1 is formed continuously with a metal film of the same layer as a line DRW1 formed of the metal layer M2. The drain electrode of the inspection thin-film transistor QDTr1 is formed of a metal film of the same layer as the line DRW1. Below the terminal SLT1, a line DRSL1 that connects the drain electrode of the inspection thin-film transistor QDTr1 and the source line SL1 to one another is disposed. The line DRSL1 is connected to the source line SL1 formed of the metal layer M1 and the terminal SLT1 at a contact portion CNT1. The width (length in the direction X) of the line DRSL1 is wider than that of the drain electrode of the inspection thin-film transistor QDTr1, and narrower than that of the terminal SLT1.

The gate electrode of the inspection thin-film transistor QDTr5 located below the terminal SLT5 is formed continuously with a metal film of the same layer as the line TGW2 formed of the metal layer M1. The source electrode of the inspection thin-film transistor QDTr5 is formed continuously with a metal film of the same layer as a line DGW2 formed of the metal layer M2. The drain electrode of the inspection thin-film transistor QDTr5 is formed of a metal film of the same layer as the line DGW2. Below the terminal SLT5, a line DRSL5 that connects the drain electrode of the inspection thin-film transistor QDTr5 and the source line SL5 to one another is disposed. The line DRSL5 is connected to the source line SL5 formed of the metal layer M1 and the terminal SLT5 at a contact portion CNT5. The width (length in the direction X) of the line DRSL5 is wider than that of the drain electrode of the inspection thin-film transistor QDTr5, and narrower than the terminal SLT5. The width (length in the direction X) of the line DGW2 located below the terminal SLT5 is wider than that of the source electrode of the inspection thin-film transistor QDTr5, and narrower than that of the terminal SLT5.

Figure 11:
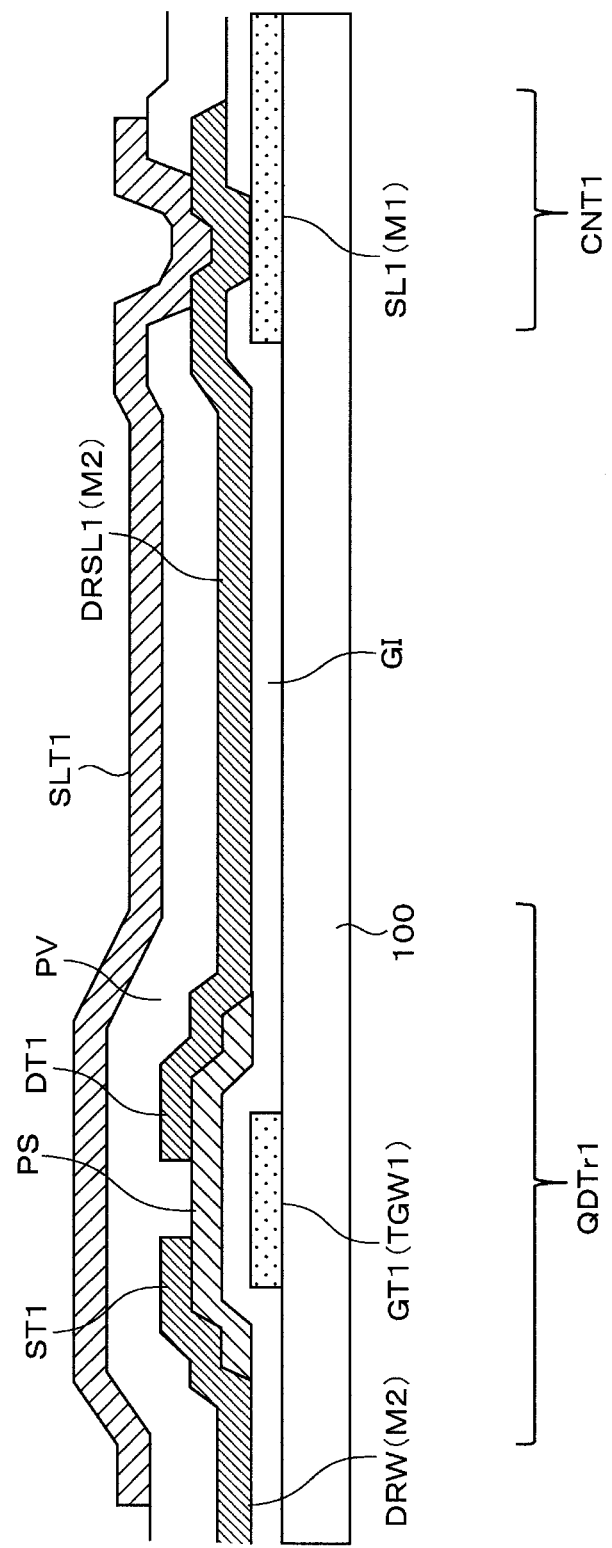
FIG. 11 is a sectional view taken along Line B-B in FIG. 10A.

FIG. 11 shows a sectional view taken along Line B-B in FIG. 10A. A gate electrode GT1 (line TGW1) of the inspection thin-film transistor QDTr1 and the source line SL1 are formed of the metal layer M1 on the TFT substrate 100. The semiconductor layer PS is formed on the gate electrode GT1 via the insulating film GI. A source electrode ST1 and drain electrode DT1 are formed on the semiconductor layer PS. The source electrode ST1 and line DRW are integrally formed of the metal layer M2. The drain electrode DT1 and line DRSL1 are integrally formed of the metal layer M2. The line DRSL1 and source line SL1 are connected to one another at the contact portion CNT1. The terminal SLT1 is formed on the source electrode ST1, drain electrode DT1, and line DRSL1 via a passivation film (insulating film) PV. The line DRSL1 and terminal SLT1 are connected to one another at the contact portion CNT1.

Figure 12:
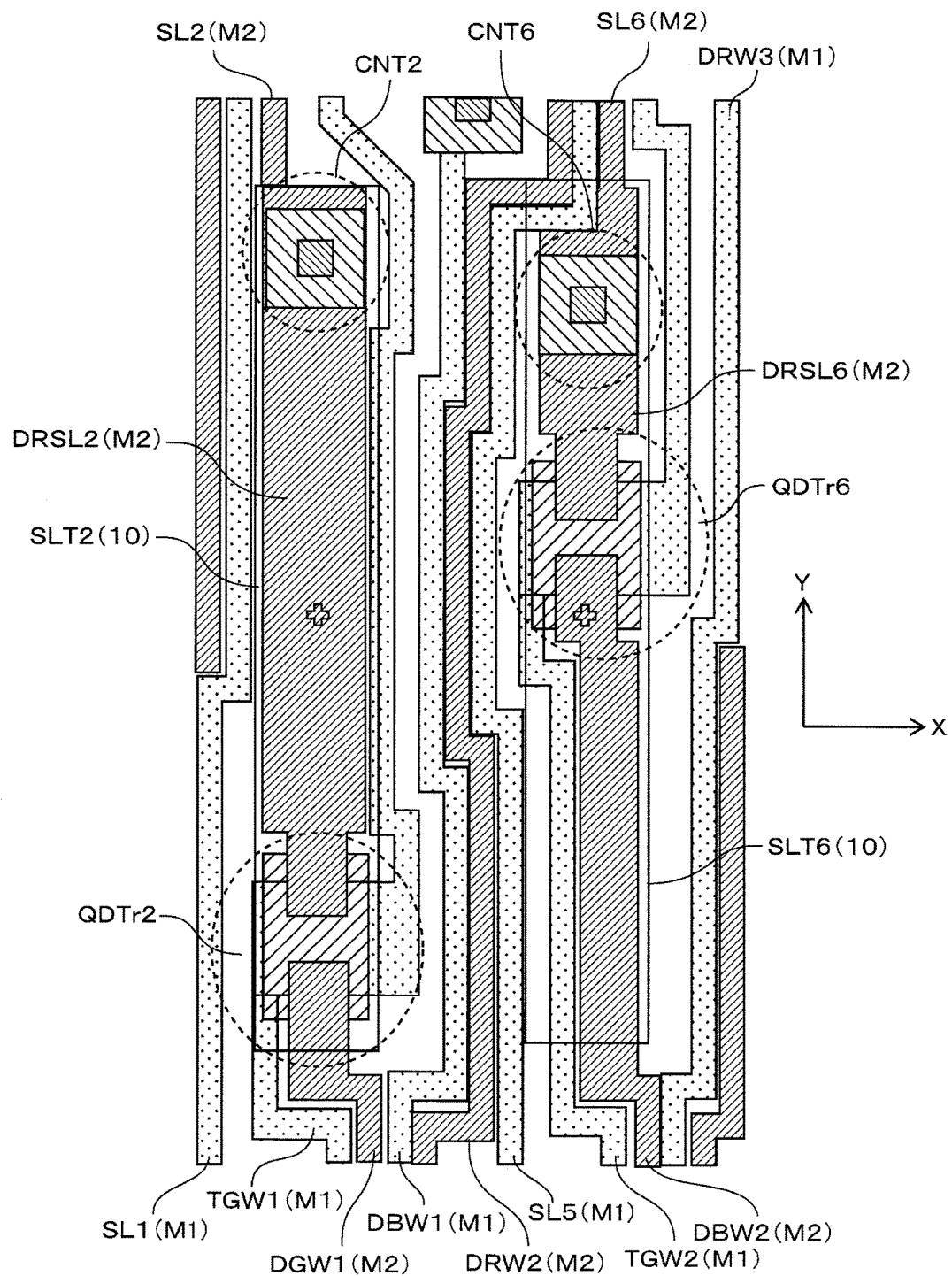
FIG. 12 is an exploded layout pattern of a portion (d) squared by the thick solid line in FIG. 6.

FIG. 12 shows an exploded layout pattern of a portion (d) squared by the thick solid line in FIG. 6. Below the terminals SLT2 and SLT6 formed of the transparent conductive films (ITO), inspection thin-film transistors QDTr2 and QDTr6 are disposed, respectively. The gate electrode of the inspection thin-film transistor QDTr2 located below the terminal SLT2 is formed continuously with a metal film of the same layer as the line TGW1 formed of the metal layer M1. The source electrode of the inspection thin-film transistor QDTr2 is formed continuously with a metal film of the same layer as the line DGW1 formed of the metal layer M2. The drain electrode of the inspection thin-film transistor QDTr2 is formed of a metal film of the same layer as the line DGW1. Below the terminal SLT2, a line DRSL2 that connects the drain electrode of the inspection thin-film transistor QDTr2 and the source line SL2 to one another is disposed. The line DRSL2 is connected to the terminal SLT2 at a contact portion CNT2. The width (length in the direction of X) of the line DRSL2 is wider than that of the drain electrode of the inspection thin-film transistor QDTr2, and narrower than that of the terminal SLT2.

The gate electrode of the inspection thin-film transistor QDTr6 located below the terminal SLT6 is formed continuously with a metal film of the same layer as a line TGW2 formed of the metal layer M1. The source electrode of the inspection thin-film transistor QDTr6 is formed continuously with a metal film of the same layer as the line DBW2 formed of the metal layer M2. The drain electrode of the inspection thin-film transistor QDTr6 is formed of a metal fim of the same layer as the line DBW2. Below the terminal SLT6, a line DRSL6 that connects the drain electrode of the inspection thin-film transistor QDTr6 and the source line SL6 to one another is disposed. The line DRSL6 is connected to the terminal SLT6 at a contact portion CNT6. The width (length in the direction X) of the line DRSL6 is wider than that of the drain electrode of the inspection thin-film transistor QDTr6, and narrower than that of the terminal SLT6. The width (length in the direction X) of the line DBW2 located below the terminal SLT6 is generally the same as that of the source electrode of the inspection thin-film transistor QDTr6. This is to pass the line TGW2 below the terminal SLT6. Accordingly, the inspection thin-film transistor QDTr6 is disposed not near the left end of but near the center of the terminal SLT6. Part of the line DBW2 and part of the source line SL5 pass below the terminal SLT6. Therefore, the contact portion CNT6 is disposed leftward from the right end of the terminal SLT6.

Figure 13:
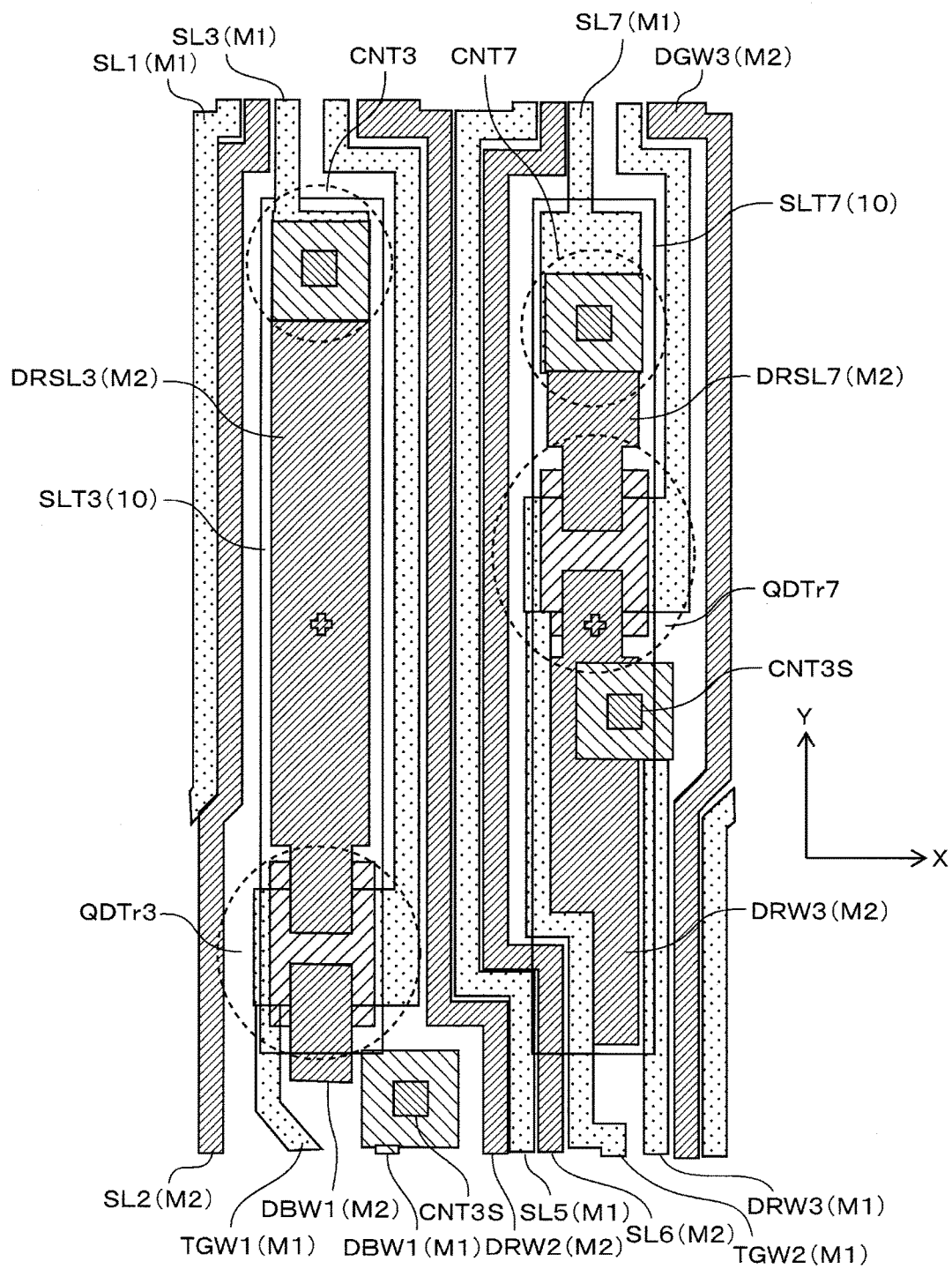
FIG. 13 is an exploded layout pattern of a portion (e) squared by the thick solid line in FIG. 6.

FIG. 13 shows an exploded layout pattern of a portion (e) squared by the thick solid line in FIG. 6. Below the terminal SLT3 and a terminal SLT7 that are formed of the transparent conductive films (ITO), inspection thin-film transistors QDTr3 and QDTr7 are disposed, respectively. The gate electrode of the inspection thin-film transistor QDTr3 located below the terminal SLT3 is formed continuously with a metal film of the same layer as the line TGW1 formed of the metal layer M1. The source electrode of the inspection thin-film transistor QDTr3 is formed continuously with a metal film of the same layer as the line DBW1 formed of the metal layer M2. The line DBW1 formed of the metal layer M1 is connected to the line DBW1 formed of the metal layer M2 at a contact portion CNT3S. The drain electrode of the inspection thin-film transistor QDTr3 is formed of a metal film of the same layer as the line DBW1 formed of the metal layer M2. Below the terminal SLT3, a line DRSL3 that connects the drain electrode of the inspection thin-film transistor QDTr3 and the source line SL3 to one another is disposed. The line DRSL3 is connected to the source line SL3 and terminal SLT3 at a contact portion CNT3. The width (length in the direction X) of the line DRSL3 is wider than that of the drain electrode of the inspection thin-film transistor QDTr3, and narrower than that of the terminal SLT3.

The gate electrode of the inspection thin-film transistor QDTr7 located below the terminal SLT7 is formed continuously with a metal film of the same layer as the line TGW2 formed of the metal layer M1. The source electrode of the inspection thin-film transistor QDTr7 is formed continuously with a metal film of the same layer as a line DRW3 formed of the metal layer M2. A line DRW3 formed of the metal layer M1 is connected to the line DRW3 formed of the metal layer M2 at the contact portion CNT3S. The drain electrode of the inspection thin-film transistor QDTr7 is formed of a metal film of the same layer as the line DRW3 formed of the metal layer M2. Below the terminal SLT7, a line DRSL7 that connects the drain electrode of the inspection thin-film transistor QDTr7 and the source line SL7 to one another is disposed. The line DRSL7 is connected to the source line SL7 and terminal SLT7 at a contact portion CNT7. The width (length in the direction X) of the line DRSL7 is wider than that of the drain electrode of the inspection thin-film transistor QDTr7, and narrower than the terminal SLT7. The width (length in the direction X) of the source line DRW3 located below the terminal SLT7 is wider than that of the source electrode of the inspection thin-film transistor QDTr7, and narrower than that of the terminal SLT7. Since part of the line TGW2 and part of the source line SL7 are disposed below the terminal SLT7, there is a place where the width of the line DRW3 is narrow. The line DRW3 formed of the metal layer M1 is connected to the DRW3 formed of the metal layer M2 at a contact portion CNT7S. The contact portion CNT7S is disposed below the terminal SL7. Accordingly, the inspection thin-film transistor QDTr7 is disposed not near the left end of but near the center terminal SLT7. The contact portion CNT7 is disposed leftward from the right end of the terminal SLT7.

Figure 14:
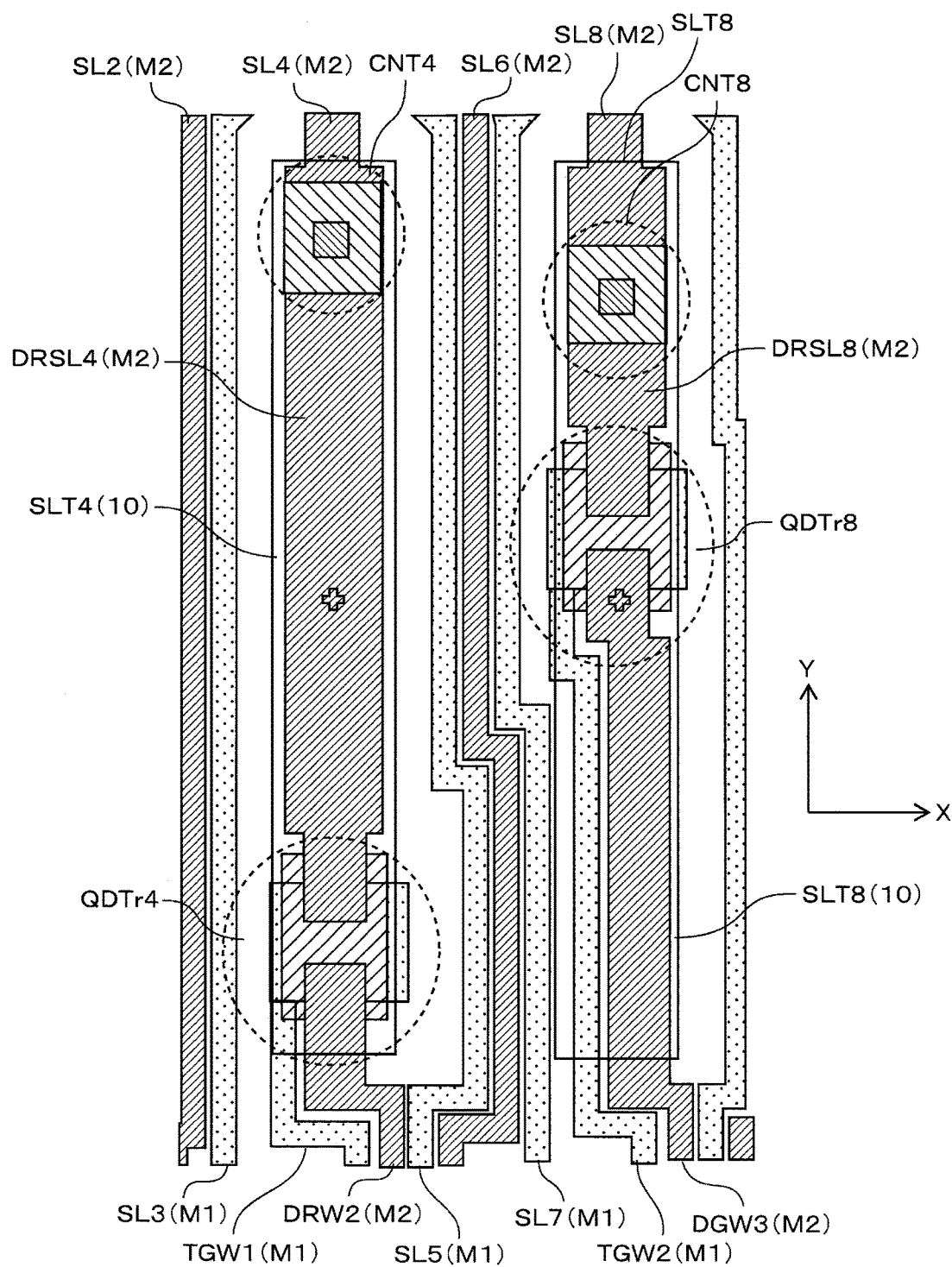
FIG. 14 is an exploded layout pattern of a portion (f) squared by the thick solid line in FIG. 6.

FIG. 14 is an exploded layout pattern of a portion (f) squared by the thick solid line in FIG. 6. Below the terminal SLT4 and a terminal SLT8 that are formed of the transparent conductive films (ITO), the inspection thin-film transistor QDTr4 and an inspection thin-film transistor QDTr8 are disposed, respectively. The gate electrode of the inspection thin-film transistor QDTr4 located below the terminal SLT4 is formed continuously with a metal film of the same layer as the line TGW1 formed of the metal layer M1. The source electrode of the inspection thin-film transistor QDTr4 is formed continuously with a metal film of the same layer as the line DRW2 formed of the metal layer M2. The drain electrode of the inspection thin-film transistor QDTr4 is formed of a metal film of the same layer as the line DRW2 formed of the metal layer M2. Below the terminal SLT4, a line DRSL4 that connects the drain electrode of the the inspection thin-film transistor QDTr4 and the source line SL4 to one another is disposed. The line DRSL4 is connected to the source line SL4 and terminal SLT4 at a contact portion CNT4. The width (length in the direction X) of the line DRSL4 is wider than that of the drain electrode of the inspection thin-film transistor QDTr4, and narrower than that of the terminal SLT4.

The gate electrode of the inspection thin-film transistor QDTr8 located below the terminal SLT8 is formed continuously with a metal film of the same layer as the line TGW2 formed of the metal layer M1. The source electrode of the inspection thin-film transistor QDTr8 is formed continuously with a metal film of the same layer as the line DGW3 formed of the metal layer M2. The drain electrode of the inspection thin-film transistor QDTr8 is formed of a metal film of the same layer as the line DGW3 formed of the metal layer M2. Below the terminal SLT8, a line DRSL8 that connects the drain electrode of the inspection thin-film transistor QDTr8 and a source line SL8 to one another is disposed. The line DRSL8 is connected to the source line SL8 and terminal SLT8 at a contact portion CNT8. The width (length in the direction X) of the line DRSL8 is wider than that of the drain electrode of the inspection thin-film transistor QDTr8, and narrower than the terminal SLT8. The width (length in the direction X) of the line DGW3 located below the terminal SLT8 is wider than that of the source electrode of the inspection thin-film transistor QDTr8, and narrower than that of a terminal SLT8. Since part of the line TGW2 is disposed below the terminal SLT8, there is a place where the width of the line DGW3 is narrow. Accordingly, the inspection thin-film transistor QDTr8 is disposed not near the left end of but near the center terminal SLT8. The contact portion CNT8 is disposed leftward from the right end of the terminal SLT8.

When the terminal pitch is about 9 micrometers, the terminal width is about 18 micrometers, and the line width is about 4 micrometers, the terminals (for example, the terminals SLT1, SLT2) corresponding to the adjacent source lines overlap in the direction X. Therefore, the terminals are offset from one another in the direction Y. To pass the lines also between the adjacent terminals (for example, the terminals SLT1, SLT5) in the direction X, the space by three terminals is provided therebetween. That is, the terminals are arranged in four-step staggered manner. Therefore, the width (direction Y) of the output terminal area is large, and the space (direction Y) between the input terminal area and the output terminal area is narrow. However, as in this example, by providing the transistors of the inspection circuit below the terminals, compactness is achieved even when the transistor size is unchanged in the same equivalent circuit as Patent Document 1. It becomes possible to dispose the inspection circuit toward the output terminal area from the end of the output terminal area side of the input terminal area.

To dispose the transistors, the contact areas with the terminals (ITO) are made small, and the widths of the lines connected to the drain electrodes and the widths of the adjacent lines are expanded partially so that the metal films may be disposed below the terminals (ITO). Accordingly, the impression of ACF electric conduction particles can be monitored and the management of the number of electric conduction particles is possible.

<Modification 1>

Figure 15A:
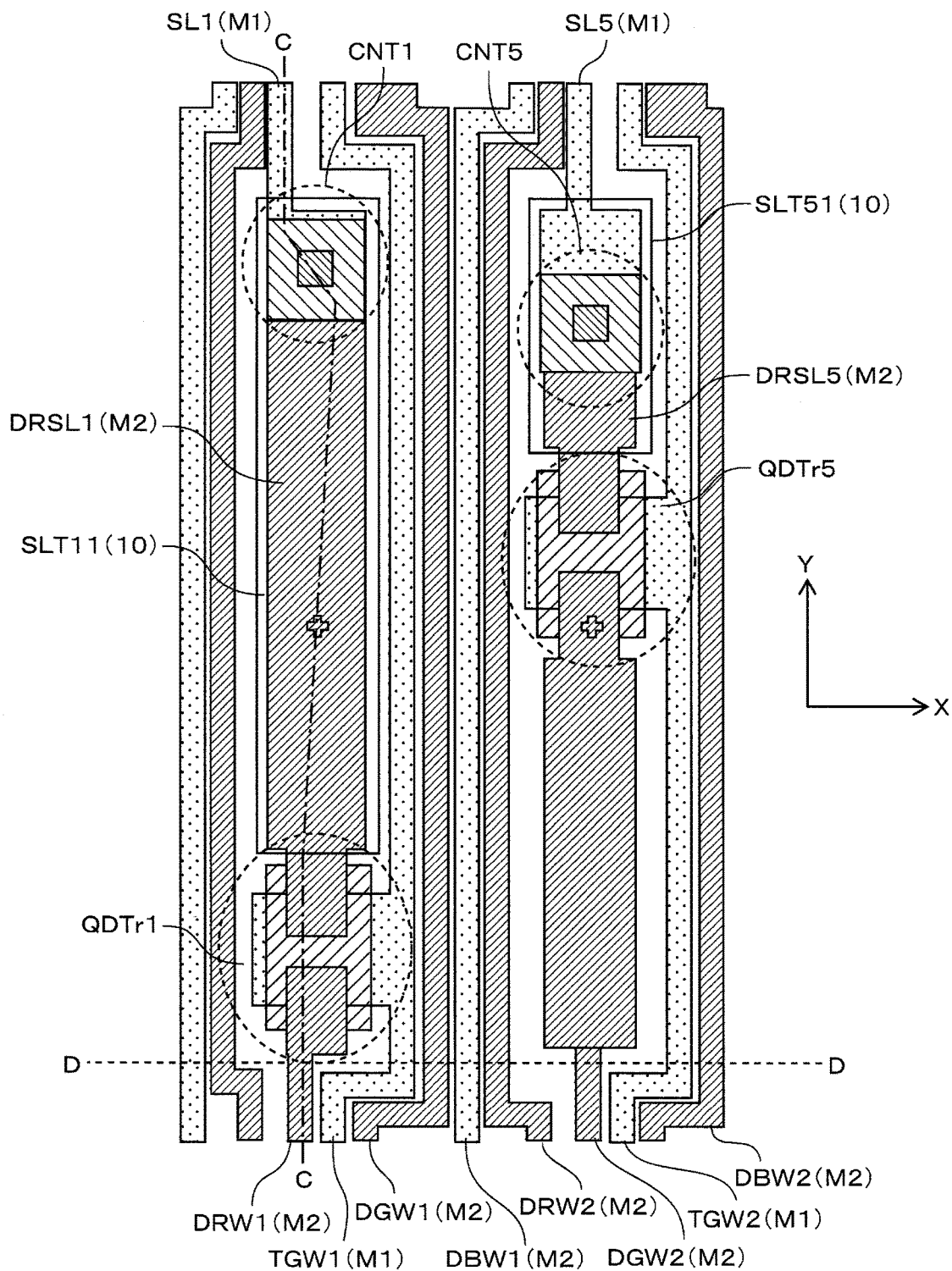
FIG. 15A is a layout pattern of a lighting inspection circuit in a liquid crystal display device of Modification 1.
Figure 15B:
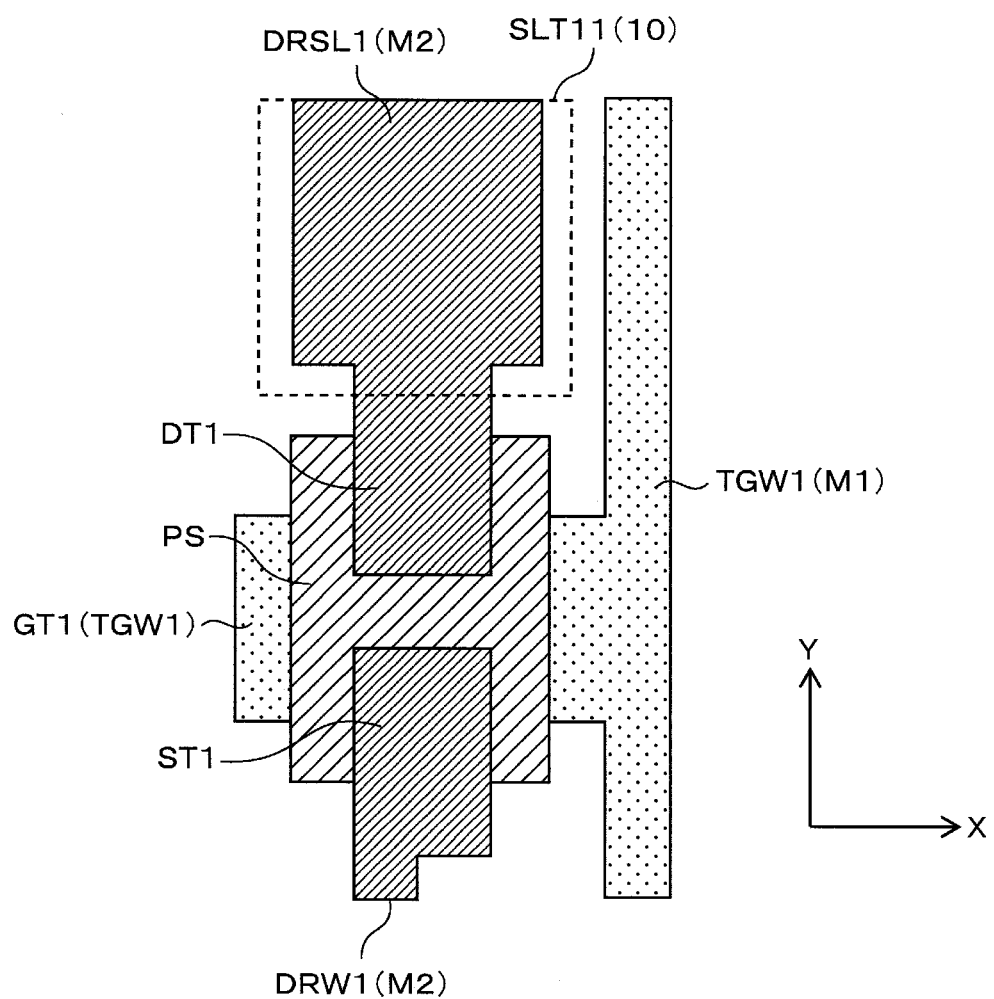
FIG. 15B is an exploded layout pattern of the inspection thin-film transistor portion in FIG. 15A.

A first modification (Modification 1) of the display device of Example 1 is explained. In this modification, only the sizes of the transparent conductive films (ITO) that form the terminals are different from those of the display device of Example 1. FIG. 15A shows a layout showing the modification of the display device of Example 1. This is an exploded layout pattern of the portion (c) squared by the thick solid line in FIG. 6 of Example 1. That is, FIG. 15A corresponds to FIG. 10A of Example 1. FIG. 15B shows an exploded layout pattern of the inspection thin-film transistor portion in FIG. 15A.

Below terminals SLT11 and SLT51 formed of the transparent conductive films (ITO), the inspection thin-film transistors QDTr1 and QDTr5 are not disposed. In Example 1, the transparent conductive films that form the terminals SLT1 and SLT5 extend to Line D-D of FIG. 15. On the other hand, in this modification, the transparent conductive films that form the terminals SLT11 and SLT51 extend only short of the inspection thin-film transistors QDTr1 and QDTr5, respectively.

FIG. 16 is a sectional view taken along Line C-C in FIG. 15A. Except that the terminal SLT11 does not extend onto the inspection thin-film transistor QDTr1, FIG. 16 is the same as FIG. 11 of Example 1. Since the inspection thin-film transistors are not disposed below the terminals, the short circuit of each bump potential and inspection thin-film transistor is preventable even when the ACF electric conduction particles crack the transparent conductive films (ITO) that form the terminals at the time of strong compression of the IC driver.

<Modification 2>

Figure 17:
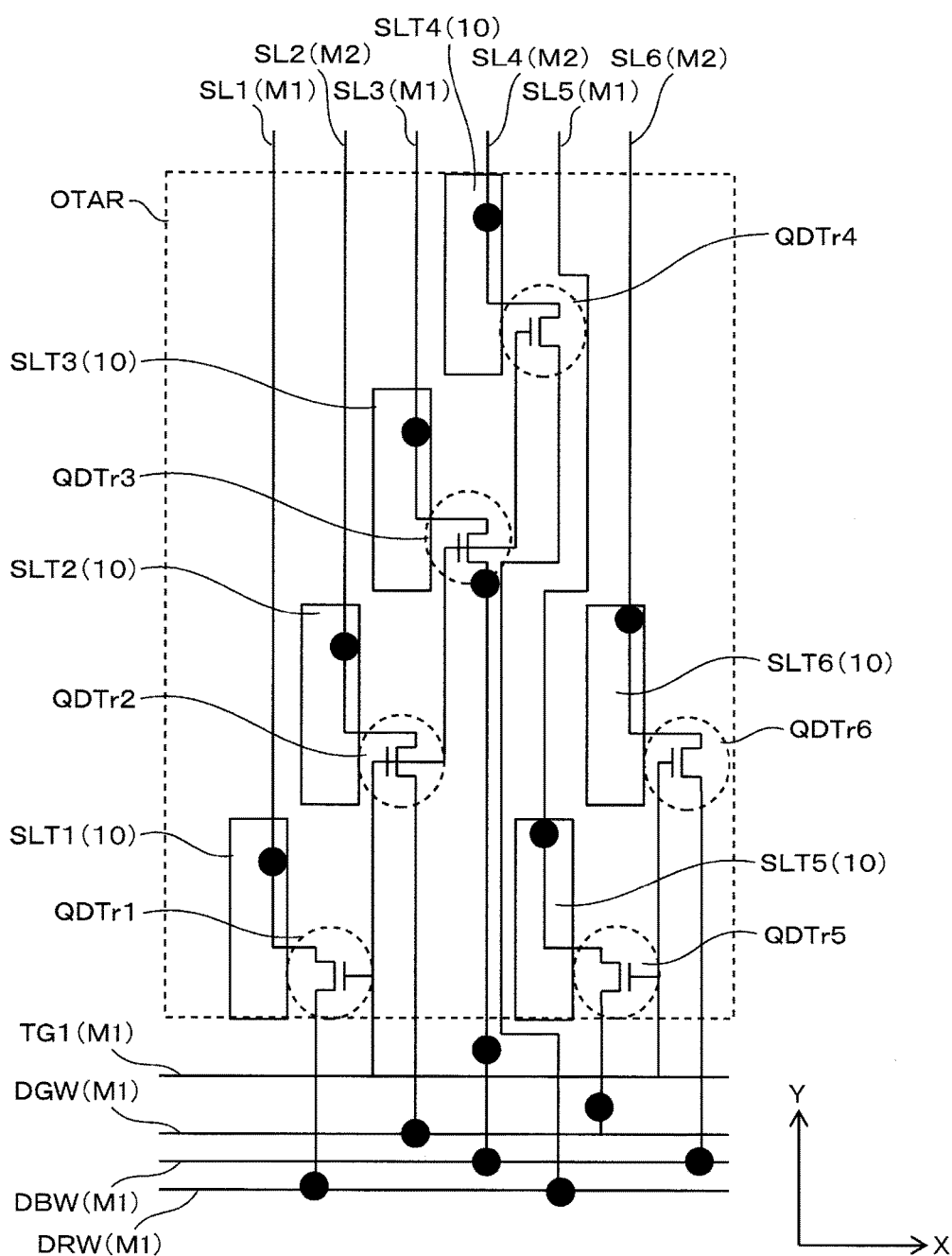
FIG. 17 is a circuit configuration of a lighting inspection circuit in a liquid crystal display device of Modification 2.

A second modification (Modification 2) of the display device of Example 1 is explained. This modification is different from the display device of Example 1 in arrangement of the inspection thin-film transistors QDTr. That is, in Example 1, the inspection thin-film transistors QDTr are disposed below the terminals. On the other hand, in Modification 2, the inspection thin-film transistors QDTr are shifted to the sides of the terminals. FIG. 17 shows a circuit configuration of a lighting inspection circuit in the liquid crystal display device of Modification 2. The circuit configuration of FIG. 17 also shows its layout arrangement. In comparison to FIG. 5 of Example 1, only arrangement of the inspection thin-film transistors QDTr is different. That is, the inspection thin-film transistors QDTr are shifted to the sides of the terminals (in the direction X).

Figure 18:
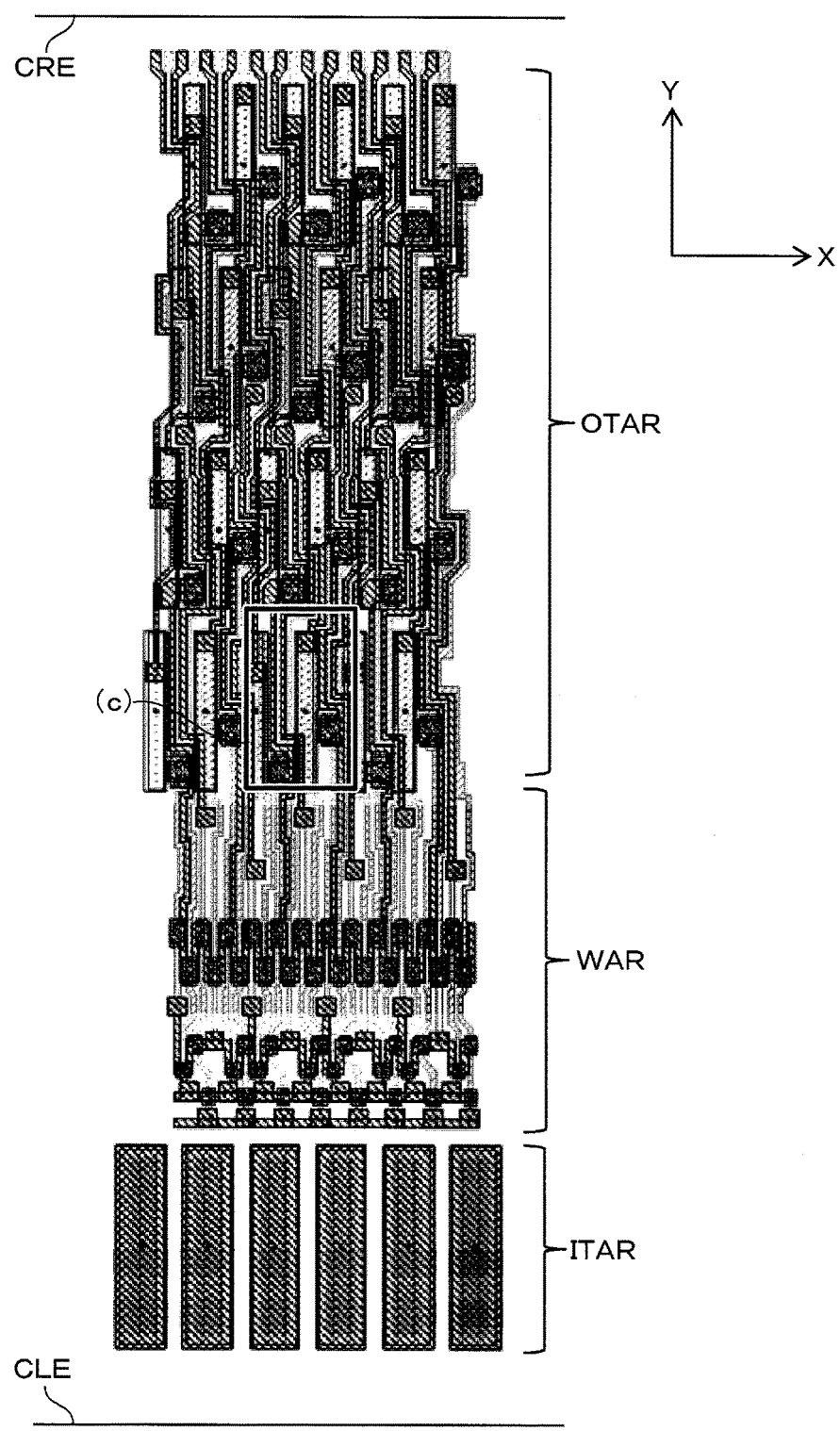
FIG. 18 is a layout pattern of the lighting inspection circuit in the liquid crystal display device of Modification 2.

FIG. 18 shows a layout pattern of the lighting inspection circuit in the liquid crystal display device of Modification 2. The input terminal area ITAR to which the group of input terminals of the semiconductor chip is connected and the wiring area WAR are the same as FIG. 6 of Example 1. The layout pattern of the output terminal area (inspection transistor area) OTAR to which the output terminal group of the semiconductor chip is connected is different from Example 1. In FIG. 18, one layout pattern including twelve terminals, twelve inspection thin-film transistors and lines therewith, and contacts is repeated.

Figure 19A:
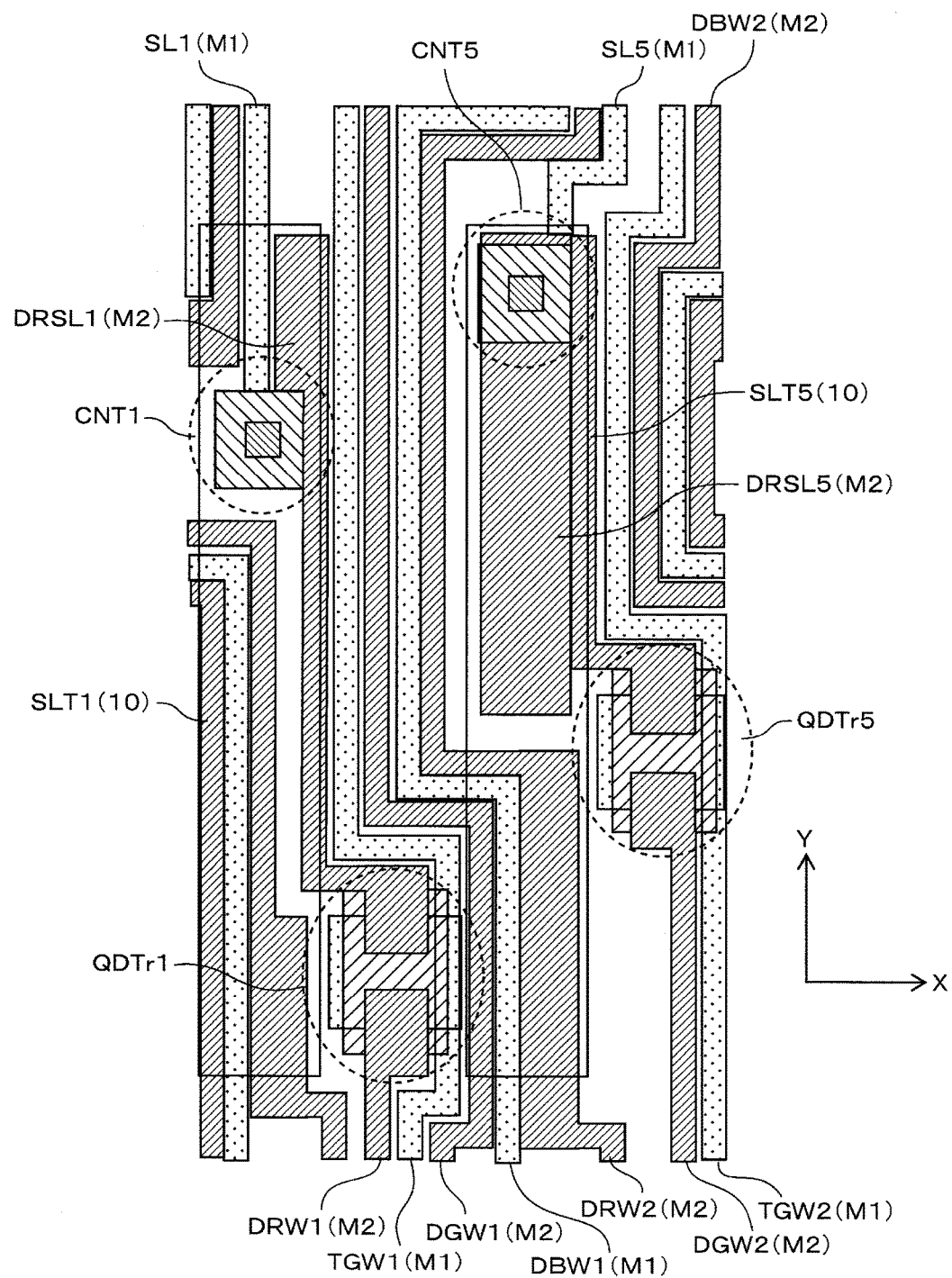
FIG. 19A is an exploded layout pattern of a portion (a) squared by the thick solid line in FIG. 18.
Figure 19B:
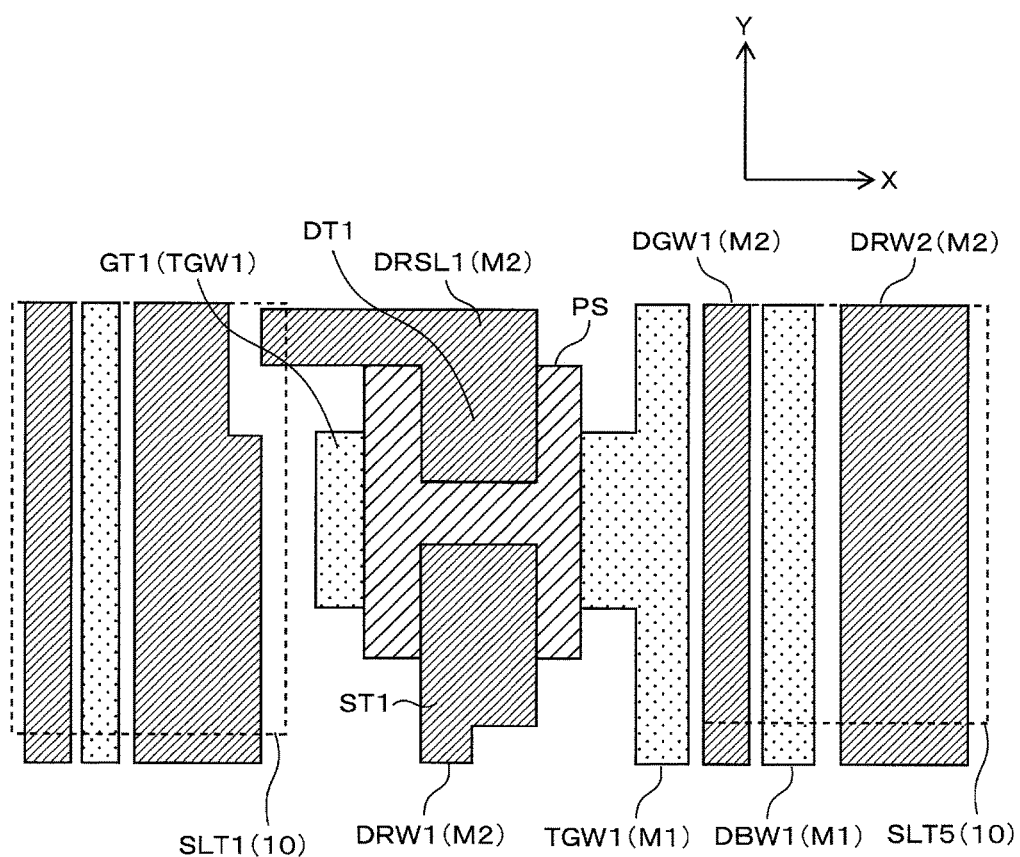
FIG. 19B is an exploded layout pattern of an inspection thin-film transistor portion in FIG. 19A.

FIG. 19A shows an exploded layout pattern of a portion (c) squared by the thick solid line in FIG. 18. FIG. 19B shows an exploded layout pattern of a portion of the inspection thin-film transistor in FIG. 19A. The inspection thin-film transistors QDTr1 and QDTr5 are disposed to the positions shifted to the sides of the terminals SLT1 and SLT5 (in the direction X) formed of the transparent conductive films (ITO), respectively. That is, the inspection thin-film transistor QDTr1 is disposed between the terminal SLT1 and terminal SLT5. The lines DGW1, DBW1, DRW2, etc. adjacent thereto are also shifted in the direction X. Therefore, part of the lines DGW1, DBW1, and DRW2 are disposed below the terminal SLT5. Part of the line DRSL1 that connects the drain electrode of the inspection thin-film transistor QDTr1 and source line SL1 to one another is shifted from the terminal SLT1 in the direction X. The line DRSL1 is connected to the source line SL1 formed of the metal layer M1 and the terminal SLT1 at the contact portion CNT1. The width (length in the direction X) of the wiring located below the terminal SLT1 is wider than that of the wiring located outside the terminal SLT1, and narrower than that of the terminal SLT1.

Below the terminal SLT5, the line DRSL5 that connects the drain electrode of the inspection thin-film transistor QDTr5 and the source line SL5 to one another is disposed. The line DRSL5 is connected to the source line SL5 formed of the metal layer M1 and the terminal SLT5 at the contact portion CNT5. The width (length in the direction X) of the line DRSL5 is wider than that of the drain electrode of the inspection thin-film transistor QDTr5, and narrower than the terminal SLT5. The width (length in the direction X) of the line DRW2 located below the terminal SLT5 is wider than that thereof located outside the terminal SLT5, and narrower than that of the terminal SLT5.

Since the inspection thin-film transistors are not disposed below the terminals, even when the ACF electric conduction particles crack the transparent conductive films (ITO) that form the terminals at the strong compression of the IC driver, the short circuit of each bump potential and inspection thin-film transistor is preventable.

Example 2

Figure 20:
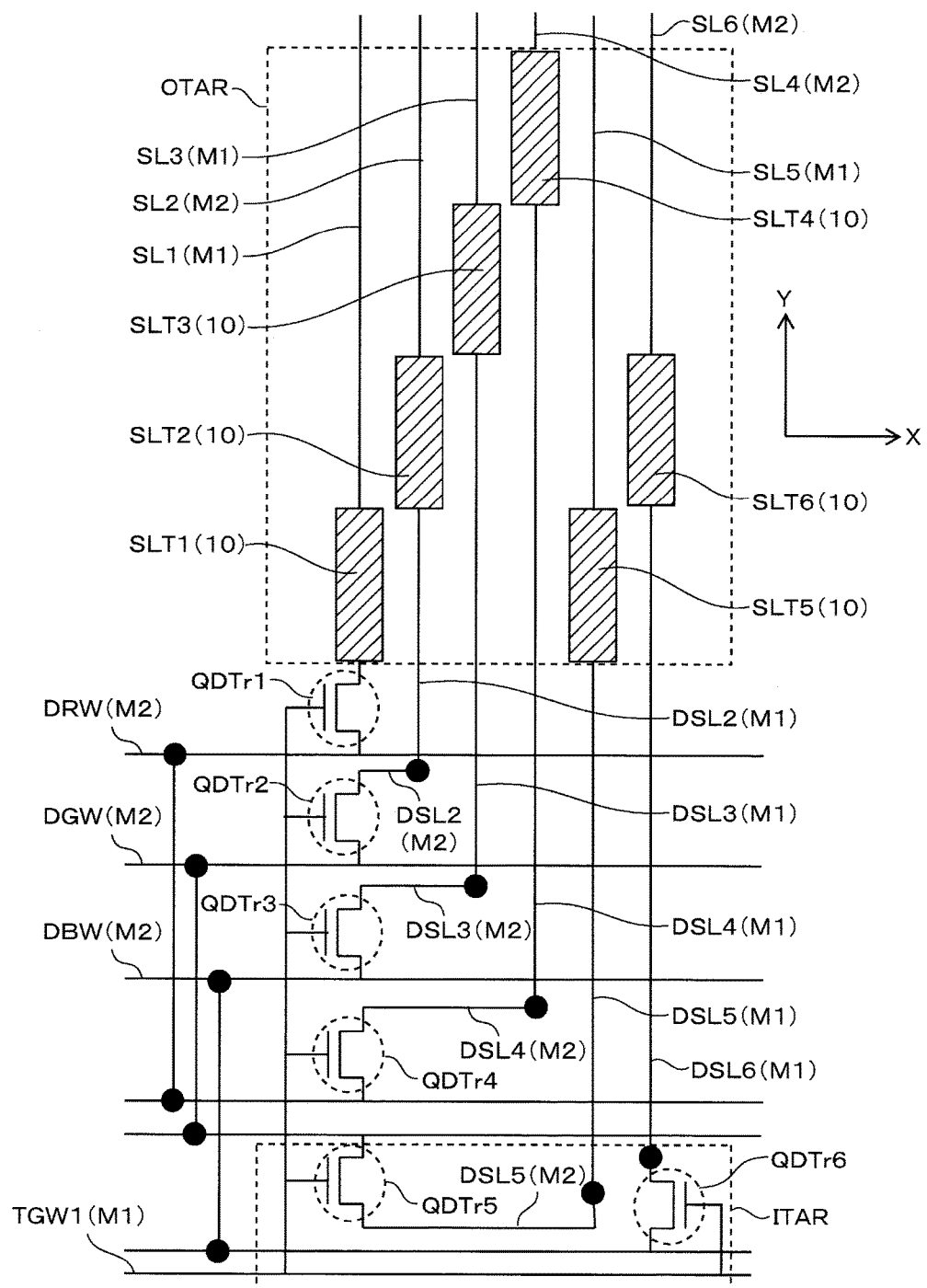
FIG. 20 is a circuit configuration of a lighting inspection circuit in a liquid crystal display device of Example 2.

FIG. 20 shows a circuit configuration of a lighting inspection circuit in a liquid crystal display device of Example 2. The circuit configuration view of FIG. 20 also shows its layout arrangement. In Example 2, unlike in Example 1, the inspection thin-film transistors QDTr are not disposed to the output terminal area OTAR, but are disposed leftward from the end of the input terminal area ITAR side of the output terminal area OTAR (negative direction in the direction Y). The line TG1 extends in the direction X as in Example 1, but unlike Example 1, is disposed to the side of the input terminal area ITAR.

Unlike in Example 1, the lines DRW, DGW, and DBW extend by every two in the direction X. The source lines SL1, SL2, SL3, SL4, SL5, and SL6 extend in the direction Y as in Example 1. The terminals SLT1, SLT2, SLT3, SLT4, SLT5, and SLT6 are in the four-step staggered arrangement as in Example 1.

The metal layer M1 that forms the gate electrodes of the inspection thin-film transistors QDTr are used for the line TG1 that extends in the direction X and direction Y and the lines DRW, DGW, and DBW that extend in the direction X. The metal layer M1 is used for the source lines SL1, SL3, and SL5 as in Example 1. On the other hand, the metal layer M2 that forms the source electrodes and drain electrodes of the inspection thin-film transistors QDTr are used for the lines DRW, DGW, and DBW that extend in the direction X. The metal layer M2 is used for the source lines SL2, SL4, and SL6 as in Example 1. The metal layer M1 and metal layer M2 are formed in different layers respectively, and can be thus disposed proximate to each other. The black dots shown in FIG. 20 show contacts that connect the metal layer M1 and metal layer M2 as in FIG. 5 of Example 1. In the terminal SLT1, the metal layer M2 connected to the drain electrode of the inspection thin-film transistor QDTr in the same layer and the source line SL1 formed of the metal layer M1 are connected to one another. In the terminals SLT2, SLT4, and SLT6, the lines DSL2, DSL4, and DSL6 formed of the metal layer M1 are connected to the source lines SL2, SL4 and SL6 formed of the metal layer M2, respectively. In the terminals SLT3 and SLT5, the lines DSL3 and DSL5 formed of the metal layer M1 are connected to the source lines SL3 and SL5. In FIG. 20, the area OTAR to which the output terminal group of the IC driver 300 (semiconductor chip) is connected is from the left ends of the terminals SLT1 and SLT5 to the right end of the terminal SLOT as in Example 1. The area OTAR extends in the direction X wider than illustrated.

Figure 21:
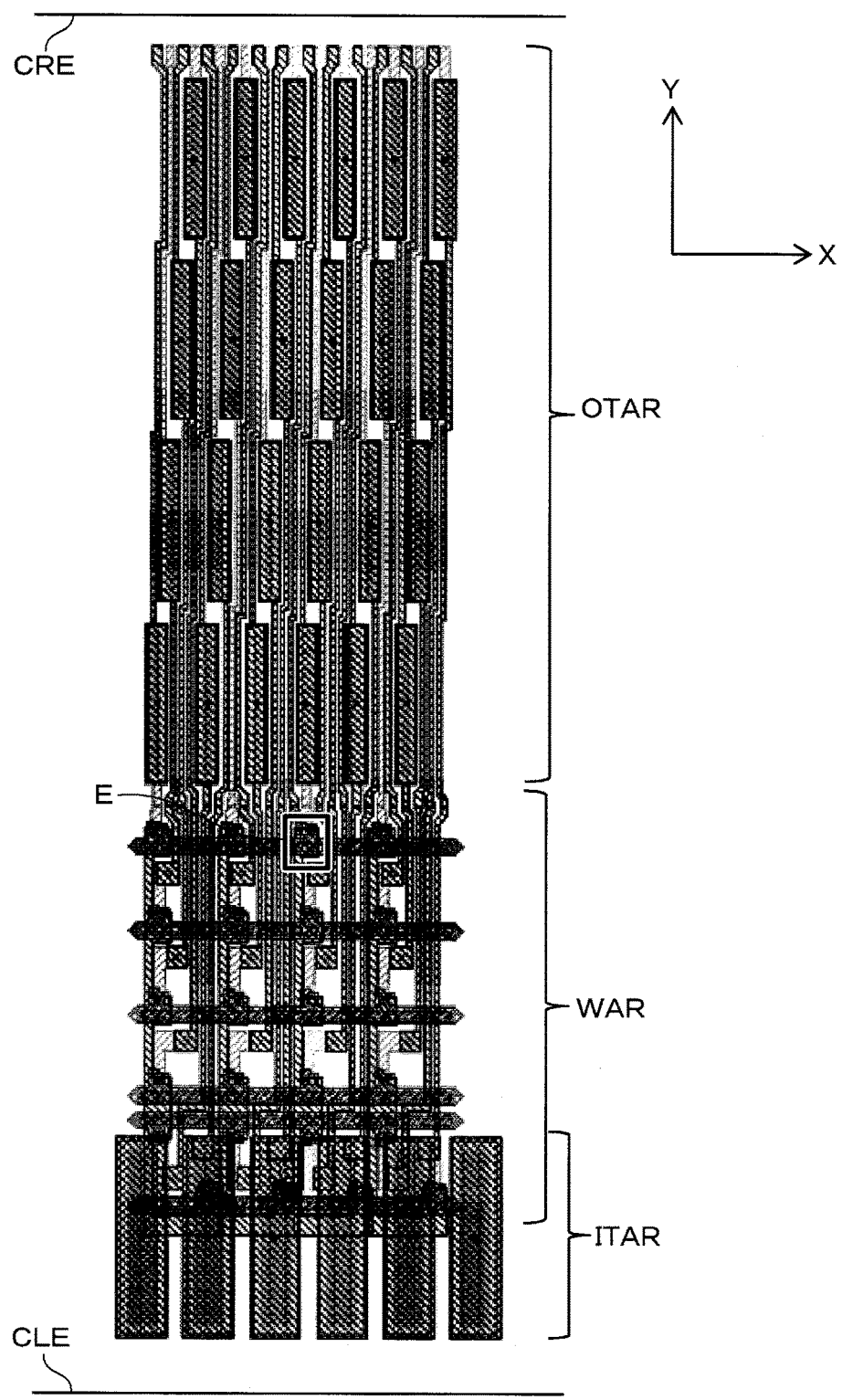
FIG. 21 is a layout pattern of the lighting inspection circuit in the liquid crystal display device of Example 2.

FIG. 21 shows a layout pattern of the lighting inspection circuit in the liquid crystal display device of Example 2. FIG. 21 shows the layout pattern of the lighting inspection circuit between the portion in which one end CLE of the semiconductor chip of the IC driver 300 is located and the portion in which the other end CRE of the semiconductor chip is located. Sequentially from the left of FIG. 21, the input terminal area ITAR to which the input terminal group of the semiconductor chip is connected, the wiring area WAR, and the output terminal area ITAR to which the output terminal group of the semiconductor chip is connected are disposed. The input terminal area ITAR and wiring area WAR overlap with one another. Part of the inspection transistors is disposed to the input terminal area ITAR. In FIG. 21, one layout pattern including twelve terminals, twelve inspection thin-film transistors and lines therewith, and contacts is repeated.

Since the terminal pitch is narrow as in Example 1, five inspection thin-film transistors QDTr are aligned in the direction Y in Example 2. However, the inspection thin-film transistors QDTr5, QDTr6 and the lines TG1 and DBW are disposed to the input terminal area ITAR. Below the terminals (input terminals) of the input terminal area ITAR, the wiring (input wiring) to connect to the terminals connected to the flexible wiring substrate 500 is disposed. When the input terminals use the same configuration as usual, a third-layer wiring other than the metal layers M1 and M2 is provided as input wiring. On the other hand, the connection area (contact area) for the input wiring and the input terminals is made small (the contact area is formed near the end CLE of the semiconductor chip), the inspection thin-film transistors QDTr5, QDTr6, and the line TG1 is able to be disposed below the input terminals.

Figure 22:
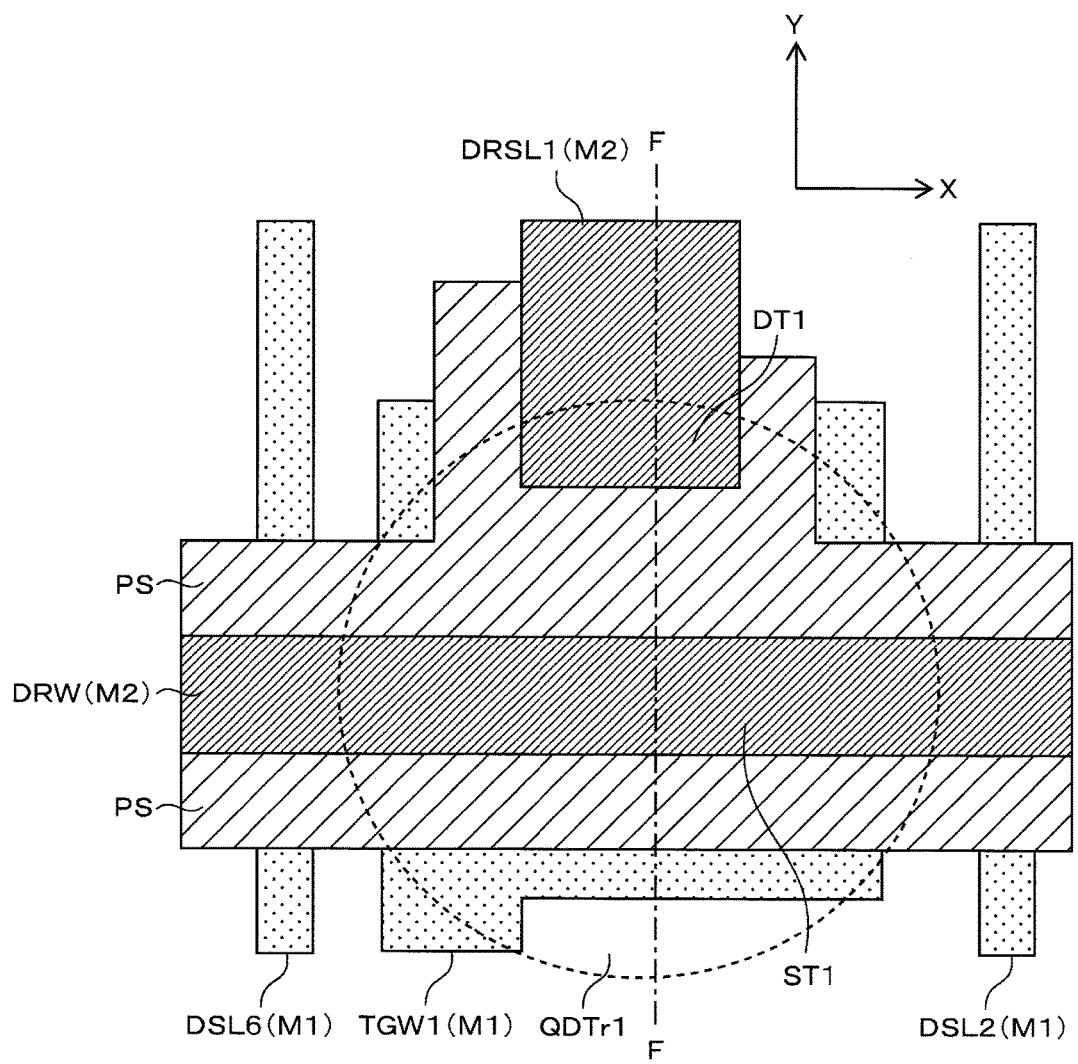
FIG. 22 is an exploded layout pattern of a portion E squared by the thick solid line in FIG. 21.

FIG. 22 shows an exploded layout pattern of a portion E squared by the thick solid line in FIG. 21. The line DRW formed of the metal layer M2 extends on the semiconductor layer PS in the direction X. The line DRSL1 formed of the metal layer M2 and connected to the drain electrode DT1 of the inspection thin-film transistor QDTr extends in the direction Y. The semiconductor layer PS also extends in the direction X. The inspection thin-film transistor QDTr1 is formed of the gate electrode GT1 connected continuously with the line TGW1 formed of the metal layer M1 in the same layer, the source electrode ST1 connected continuously with the line DRW formed of the metal layer M2 in the same layer, and the drain electrode DT1 connected continuously with wiring DRSL1 formed of the metal layer M2 in the same layer. The line DSL6 and DSL2 formed of the metal layer M1 extend in the direction Y in both sides of the inspection thin-film transistor QDTr1.

Figure 23:
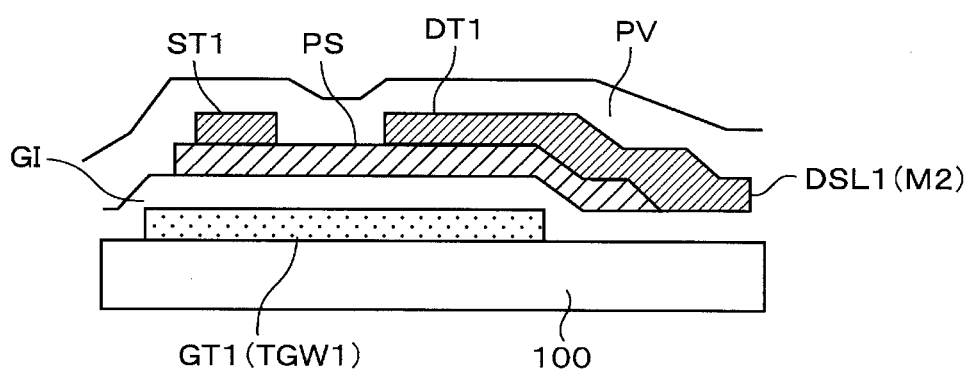
FIG. 23 is a sectional view taken along line F-F in FIG. 22.

FIG. 23 shows a sectional view taken along Line F-F in FIG. 22. The gate electrode GT1 (line TGW1) of the inspection thin-film transistor QDTr1 is formed of the metal layer M1 on the TFT substrate 100. The semiconductor layer PS is formed on the gate electrode GT1 via the insulating film GI. The source electrode ST1 and drain electrode DT1 are formed on the semiconductor layer PS. The drain electrode DT1 and line DSL1 are integrally formed of the metal layer M2. The passivation film (insulating film) PV is formed on the source electrode ST1, drain electrode DT1, and line DSL1.

As in this example, by providing part of the transistors of the inspection circuit below the input terminals, compactness is achievable even with the transistor having an unchanged size in the same equivalent circuit as Patent Document 1. Therefore, the inspection circuit is able to be disposed toward the input terminal area from the end of the input terminal area side of the output terminal area.

As mentioned above, although the invention made by the present inventors has been specifically explained on the basis of the examples, the present invention is not limited to the examples and it is clear that various modifications are possible.

What is claimed is:
1. A display device comprising:
a display area; and
a terminal area outside the display area,
the display area including:
   a plurality of TFTs;
   a plurality of scanning lines connected to the plurality of TFTs; and
   a plurality of video signal lines connected to the plurality of TFTs,
the terminal area including:
   a first terminal and a second terminal to which a semiconductor chip is connected;
   a first line;
   a second line;
   a third line; and
   a first inspection thin-filter transistor and a second inspection thin-film transistor,
the first inspection thin-film transistor including:
   a gate electrode connected to the first line;
   a source electrode connected to the second line; and
   a drain electrode, connected to the first terminal,
the second inspection thin-film transistor including:
   a gate electrode connected to the first line;
   a source electrode connected to the third line; and
   a drain electrode connected to the second terminal,
wherein the first inspection thin-film transistor is disposed between the first terminal and the substrate, and the second inspection thin-film transistor is disposed between the second terminal and the substrate,
wherein the drain electrode of the first inspection thin-film transistor is connected one of the plurality of video signal lines by a first metal layer, the drain electrode of the second inspection thin-film transistor is connected to one of the plurality of video signal lines by a second metal layer that is a different layer than that of the first metal layer, via the first metal layer and an insulating film, and
wherein the first line is formed by the first metal layer, the first line is arranged along the first metal layer connected to the drain electrode of the first inspection thin-film transistor.

2. The display device according to claim 1, where the first terminal and the second terminal are transparent conductive film disposed over a substrate.

3. The display device according to claim 1, wherein the first terminal and the second terminal are electrically connected to the semiconductor chip.

4. The display device according to claim 3, wherein the first terminal and the second terminal are connected to bumps of the semiconductor chip via an anisotropic conductive film.

5. The display device according to claim 1, wherein, the source electrode of the second inspection thin-film transistor is connected to the second metal layer, and
the distance between the first metal layer connected to the drain electrode of the first inspection thin-film transistor and the first line is small than distance between the first metal layer connected to the drain electrode of the second inspection thin-film transistor and the first line.

* * * * *